US012306738B1

(12) United States Patent
Lu et al.

(10) Patent No.: US 12,306,738 B1
(45) Date of Patent: May 20, 2025

(54) LOCAL RUNTIME REPLICATION FOR MACHINE LEARNING MODEL TRAINING ON A PROVIDER NETWORK

(71) Applicant: Amazon Technologies, Inc., Seattle, WA (US)

(72) Inventors: Zhankui Lu, Redmond, WA (US); Manoj Ravi, Mountain View, CA (US); Uday Kumar Bandaru, Sammamish, WA (US); Arun Babu Nagarajan, Redmond, WA (US); Dipankar Patro, Bothell, WA (US); Khushboo Srivastava, Walnut Creek, CA (US); Brian Ellison Granger, San Luis Obispo, CA (US); Weixun Wang, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 18/345,330

(22) Filed: Jun. 30, 2023

(51) Int. Cl.
*G06F 11/3604* (2025.01)
*G06F 8/41* (2018.01)

(52) U.S. Cl.
CPC .......... *G06F 11/3612* (2013.01); *G06F 8/433* (2013.01)

(58) Field of Classification Search
CPC .............................. G06F 11/3612; G06F 8/33
USPC .................................................. 717/120–178
See application file for complete search history.

(56) References Cited

U.S. PATENT DOCUMENTS

| 10,552,128 | B1* | 2/2020 | Bailey | G06F 9/3836 |
| 2021/0133066 | A1* | 5/2021 | He | G06F 11/3466 |
| 2022/0350585 | A1* | 11/2022 | Koester | G06F 9/4451 |

OTHER PUBLICATIONS

Großmann, Marcel, and Christos Ioannidis. "Continuous integration of applications for ONOS." 2019 IEEE Conference on Network Softwarization (NetSoft). IEEE, 2019. pp. 213-217 (Year: 2019).*
Lee, Craig A., et al. "Recent developments in high performance computing for remote sensing: A review." IEEE Journal of Selected Topics in Applied Earth Observations and Remote Sensing 4.3 (2011): pp. 508-527. (Year: 2011).*
Macedo, Daniel F., et al. "Programmable networks—From software-defined radio to software-defined networking." IEEE communications surveys & tutorials 17.2 (2015): pp. 1102-1125. (Year: 2015).*

\* cited by examiner

*Primary Examiner* — Satish Rampuria
(74) *Attorney, Agent, or Firm* — Nicholson DeVos Webster & Elliott LLP

(57) ABSTRACT

Techniques for remote computing are described. In some examples, a decorator call in source code is used to generate a remote job to be processed by a provider network using a runtime environment that replicates a runtime environment where the source code was developed. The runtime environment is replicated using information such as runtime dependencies, packages, and environment variables of the development environment.

20 Claims, 16 Drawing Sheets

```
FROM MODELTRANINGSYSTEM.REMOTE_FUNCTION IMPORT REMOTE
IMPORT NUMPY AS NP

@REMOTE(INSTANCE_TYPE="VALUE")

DEF MATRIX_MULTIPLY(A, B):
    RETURN NP.MATMUL(A, B)

A = NP.ARRAY([[1, 0], [0, 1]])
B = NP.ARRAY([1, 2])

ASSERT (MATRIX_MULTIPLY(A, B) == NP.ARRAY([1,2])).ALL()
```

*FIG. 2*

```
FROM MODELTRANINGSYSTEM.REMOTE_FUNCTION IMPORT REMOTEEXECUTOR

DEF MATRIX_MULTIPLY(A, B):
    RETURN NP.MATMUL(A, B)

A = NP.ARRAY([[1, 0],
              [0, 1]])
B = NP.ARRAY([1, 2])

WITH REMOTEEXECUTOR(MAX_PARALLEL_JOB=2, INSTANCE_TYPE="VALUE") AS E:
    FUTURE = E.SUBMIT(MATRIX_MULTIPLY, A, B)

ASSERT (FUTURE.RESULT() == NP.ARRAY([1,2])).ALL()
```

*FIG. 3*

LOCAL RUNTIME REPLICATION FOR MACHINE LEARNING MODEL TRAINING ON A PROVIDER NETWORK

BACKGROUND

Machine learning (ML) model developers can build and train ML models in several ways. Some ML model developers build and train ML models in a provider network environment using a ML model training service. This type of service allows data scientists and developers to quickly and easily build and train machine learning models and then directly deploy them into a production-ready hosted environment that does not require management of servers, manual upscaling, etc. ML training in a provider network environment can be scaled to use clusters of compute instances that simply are not feasible for most offline ML model development. These clusters allow for the training of millions, if not billions, of parameters which is generally not feasible outside of a provider network environment. These types of services also typically provide common ML algorithms.

Some ML model developers build and train ML models in a local environment. This sort of development has an advantage of not needing to understand the mechanics of the provider network environment and/or a ML model training service, but comes at the expense of time and potentially not being able to complete the training (e.g., the training may be too large for smaller hardware that does not have enough video random access memory (VRAM) for example).

BRIEF DESCRIPTION OF DRAWINGS

Various examples in accordance with the present disclosure will be described with reference to the drawings, in which:

FIG. 2 illustrates an example of a use of a @remote decorator in code to invoke a function.

FIG. 3 illustrates an example of a use of a remote executor API call in code to invoke a function.

DETAILED DESCRIPTION

Figure 1:
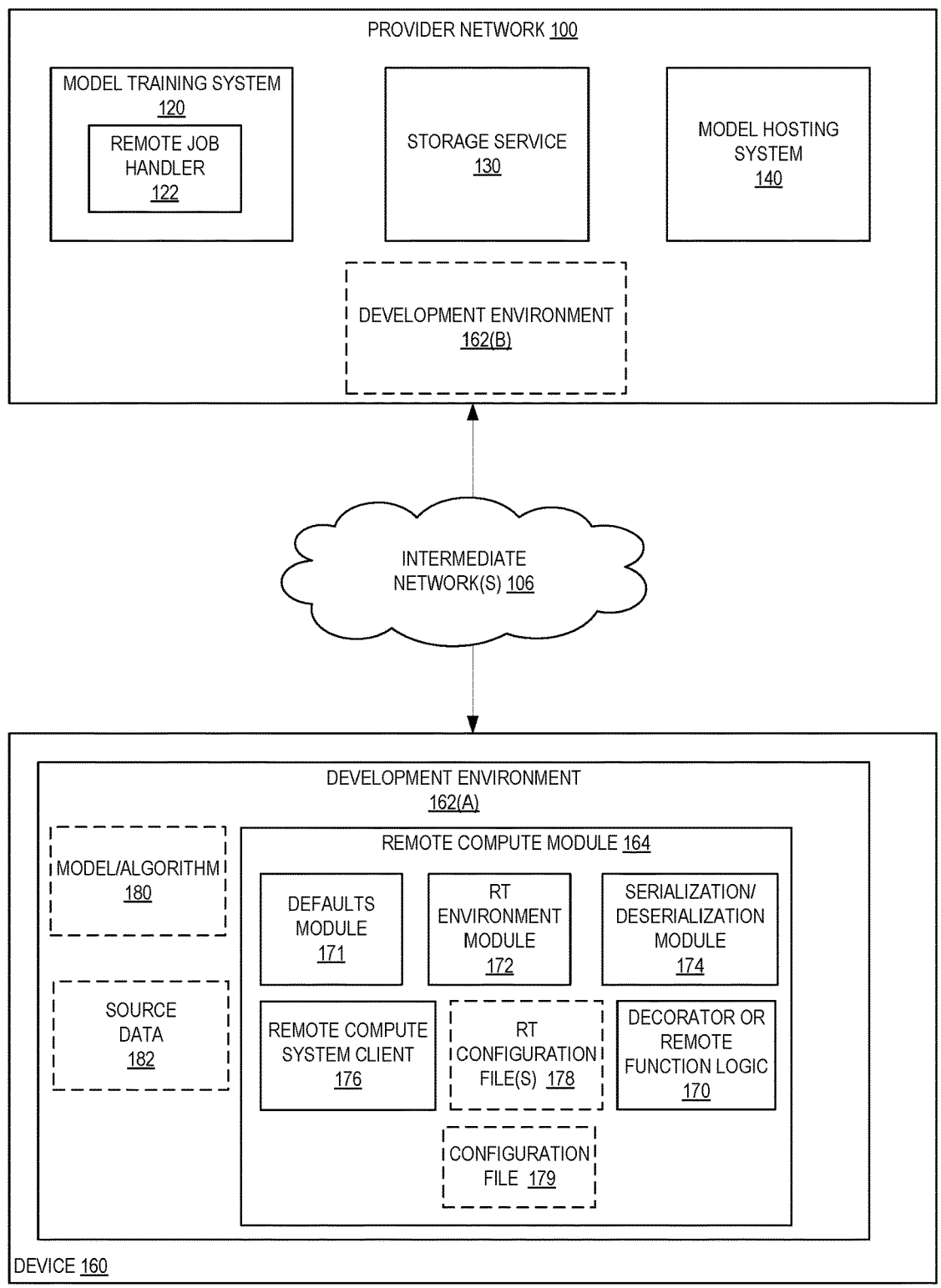
FIG. 1 illustrates examples of configuration for remote compute of a machine learning model.

The present disclosure relates to methods, apparatus, systems, and non-transitory computer-readable storage media for remote compute using a ML model training service of a provider network.

Historically, to be able to use the benefits of a ML model training service, developers and/or data scientists need to learn how the ML model training service and provider network itself work. This learning includes learning the ML model training service's application programming interfaces (APIs), containerization concepts, contracts, etc. Moreover, code that is not developed for using a ML model training service usually requires extensive, and mistake prone, updates to the code to use the training platform by attempting to understand unfamiliar technical documentation.

Detailed herein are examples that allow for a user to use a provider network's ML training service by annotating their "local" (e.g., developed without an anticipation of using a provider network) code to use a remote compute function. This annotation does not require as much, if any, learning of the APIs, etc. of the provider network. As such, users are able to take advantage of a ML model training service, but use tools that they are familiar with such as their existing integrated development environment (IDE).

To run local code as model training system remote compute job, examples described herein infer or capture configurations required to run jobs, such as, the identity and access role, encryption key and network configuration, from the studio or IDE settings, etc., and pass them to the ML training service without needing manual intervention (coding). Users have the flexibility to customize their runtime in the model training system's managed infrastructure using the inferred configuration at the software development kit (SDK)-level by passing them as arguments to a decorator call or API call. As such, data scientists, etc. need not understand provider network complexities such as container lifecycle management, roles, etc., but they can execute their workloads across different compute contexts (e.g., a local IDE, a studio, remote compute jobs) without any additional configuration overheads.

Data scientists can write, debug, and iterate their code in any preferred IDE such as a Studio, Notebooks, VSCode, PyCharm, etc. When ready, a user annotates the remote compute function (e.g., a Python function is annotated with a decorator or wrapper (e.g., @remote decorator) or a remote function API call (e.g., a constructor) is applied) and runs the annotated remote compute function as a provider network ML model training service remote compute job. A decorator wraps another function to extend the behavior of the function without permanently modifying the function. With a decorator, a function is taken as an argument into another function and then called inside the wrapper function. In some examples, when the decorator is to invoke a function, the remote compute job will wait for the function to complete before starting a new task. In some examples, when the API is used, more than one job can be run in parallel.

As such, a user's code is simply updated to include a call to an API or a decorator to invoke a remote compute function in a SDK which then generates a snapshot of associated variables, functions, packages and other runtime requirements is taken from the local ML remote compute code, serializes the snapshot (which may be more efficient that copying all of the associated variables, functions, packages and other runtime requirements to the ML model training service), and at least the serialized snapshot is submitted as to be used as a part of provider network ML model training service remote compute job. While users may use APIs of the provider network ML model training service or learn more about how the model training service works, examples detailed herein make it so that is it not necessary to learn specific constructs of the provider network ML model training service or provider network to use the model training service.

FIG. 1 illustrates examples of configuration for remote compute of a machine learning model. In this example, a model training system 120 of a provider network 100 is used to perform remote compute of a ML model (e.g., train a ML model or use a ML model) (using a remote job handler 122) that has been designed using a development environment 162(A) or 162(B) (e.g., notebook, IDE, etc.). As discussed above, the development environment 162(A) or 162(B) allows for a user to invoke the model training system 120 without having to learn all of its intricacies of the model training system 120. Models that are trained by the model training system 120 may be hosted by model hosting system 140 and stored by storage service 130 (which may also be used to store data and code to be used during remote compute). In this example, the development environment 162(A) of device 160 is shown in greater detail, but one or more aspects of the development environment 162(A) are included in the development environment 162(B).

The development environment 162(A) allows a user to develop a model to be trained (e.g., from an existing model or an algorithm 180). The model may be trained using source data 182 or remote compute data stored by storage service 130. As will be discussed, in some examples, at least a portion of the source data 182 is to be stored at least temporarily by the storage service 130 during training.

The development environment 162(A) includes a remote compute module 164. In some examples, a remote compute module 164 is included as a part of an SDK such as a Python SDK. The remote compute module 164 is called when the decorator or remote function API call are invoked.

In some examples, a remote decorator defines one or more parameters. Examples of one or more of these parameters are as follows: a function (e.g., a Python function to run as a job); an indication of one or more dependencies to install (e.g., a path to a dependences file or a keyword); one or more pre-execution commands (e.g., a list of commands to be executed prior to executing the remote function); one or more pre-execution scripts (e.g., a path to a script file to be executed prior to executing the remote function); one or more environment variables (e.g., environment variables used inside of the decorator function); an image location (e.g., a universal resource identifier (URI) location of an image); an indication of if the remote function should include local directories; an indication of a number of instances to use; an indication of an instance type to use; a name of a package management system to use (e.g., a Conda manager) during the job's runtime; a prefix used to create an underlying remote job request; an indication of a time limit to retain provisioned infrastructure (e.g., a time limit to keep a pool of resources warm); an indication of a number of times to retry the job; an indication of a time limit to run the job; an indication of a role to be used to run the job (e.g., an identity and/or access management role); a key to encrypt input and/or output data (or a link thereto); an indication of a location of a folder to store data; an indication of a session to use for service calls; a listing of security requirements; a listing of subnet identifiers; a list of tags to attach to the job; an indication of a size of storage to use for data during remote compute; an indication of whether traffic between remote compute containers is to be encrypted during remote compute; and/or an indication of whether a container will be isolated (that it not make inbound or outbound calls). In some examples, any combination of these parameters (e.g., three or more, two or more, five or more, etc.) are supported.

FIG. 2 illustrates an example of a use of a @remote decorator in code to invoke a function. The function is a matrix multiply (multiplying matrix a and matrix b).

The decorator in this example is defined as:
def remote(
\*,
\*\*kwargs):
. . .

FIG. 3 illustrates an example of a use of a remote executor API call in code to invoke a function. In some examples, the use of the API call (shown here as "WITH REMOTEEXECUTOR") causes an SDK to transform the code within the call into a remote compute job and will return the "FUTURE" object. Future objects represents an eventual result of an asynchronous operation. The remote compute job invokes the function as an asynchronous operation on the server side.

A decorator or remote function logic 170 controls acts to be performed. Detailed examples of some acts that may be performed are detailed later. In some examples, the decorator or remote function logic 170 uses a defaults module 171 to get a defined runtime (RT) configuration file 178 (e.g., a configuration defined by a user such as an administrator or data scientist) if available. This configuration allows for the customization of the runtime environment such as runtime dependencies (e.g., Python packages and environment variables). In some examples, one or both of a requirements.txt file or a package management system environment (e.g., a Conda manager) YAML (YAML Ain't Markup Language) file are used as a RT configuration file 178.

To run local Python code as a job in the model training system 120, the package(s) and dependencies need to be made available to the model training system 120. Networking and security configurations such as virtual private clouds, subnets, and security groups for model training system 120 jobs are also configurable in some examples.

When dependencies are defined with a requirements.txt, the packages will be installed in the job runtime. An example requirements.txt file contents is as follows:
datasets
transformers
torch
scikit-learn
storage_version==0.4.2
model training system version>=2.148.0

If the image used for running the job comes with conda environments, packages will be installed in the conda environment declared to be used for jobs. A conda environment.yaml file can be passed to create a Conda environment for the code to run in during the remote compute job. If the image used for running the job declares a conda environment to run the code under, the declared Conda environment will be updated with the given specification. The following code is an example of a Conda environment.yaml file:

name: model_training_system_example
    channels:
        conda-forge
    dependencies:
        python=3.10
        pandas
        pip:
            model training system In some examples, dependences in an active environment are automatically captured by the SDK.

Infrastructure related settings can be offloaded to an infrastructure configuration file 179 in some examples. Infrastructure settings cover the network configuration, identify and access roles, and one or more locations for storing input data, output data, and tags. Further, the arguments for the decorator function or API call can be put inside of the infrastructure configuration file.

An example of an infrastructure configuration file 179 is shown below.

SchemaVersion: '1.0'
    model training system:
        PythonSDK:
            Modules:
                RemoteFunction:
                    Dependencies: path/to/requirements.txt
                    EnvironmentVariables: {"EnvVarKey": "EnvVarValue" }
                    ImageUri: location
                    InstanceType: type
                    InstanceNumber: value
                    JobPMSEnvironment: name
                    PreExecutionCommands:
                    Command 1
                    Command 2
                    PreExecutionScript:
                    RoleRNn: Rn: iam::366666666666:role/MyRole
                    StorageKMSKeyId: somekmskeyid
                    StorageRootUri: //my-bucket/my-project
                    SecurityGroupIds:
                    sg123
                    Subnets:
                    subnet-1234
                    Tags:
                    {"Key": "someTagKey", "Value": "someTagValue" }
                    VolumeKmsKeyId: somekmskeyid A RT environment module 172 validates the configuration, YAML, and/or requirements.txt file or takes a snapshot of the current environment (the automatic capture) to generate an environment snapshot which is uploaded to the model training system 120. In some examples, the input source location is compressed and uploaded to the model training system 120 by the RT environment module 172.

A serialization/deserialization (SERDES) module 174 serializes arguments, returns, and/or exceptions in the function (e.g., input data) and the function itself. In some examples, a byte stream using Python's pickle protocol is generated. In some examples, there is no explicit limit on the types of function argument or return types. For example, one or more of the following items can be serialized: built-in Python objects, dictionaries, lists, tuples, or primitive data types; numpy arrays; pandas data frames; Scikit-learn datasets and estimators; PyTorch models; Tensorflow models; and/or XGBoost Boosters. In some examples, some objects cannot be serialized and will be uploaded as is such as: Python file objects; data loader objects; and/or Ctype objects containing pointers.

When a result is returned, the SERDES module 174 deserializes the result.

A model remote compute system client 176 creates a remote compute job to be run by the model training system 120. This remote compute job indicates the uploaded function, data, etc. and the desired runtime. An example of a remote compute job is below.

```
{
TrainingJobName=f' { func.__name__}_{ time_now}',
AlgorithmSpecification={
    'TrainingImage':<scikit-learn-uri>,
    'TrainingInputMode': 'File',
    'ContainerEntrypoint': [
        'python', '-m', 'invoke_remote_function'
    ],
    'ContainerArguments': [
        '--config_uri', 'storage://<storage_root_uri>/<job-name>/input/model_training_system-config.yaml',
        '--dependencies_spec_uri', 'storage://<storage_root_uri>/<job-name>/input/env.yaml',
        '--function_uri', 'storage://<storage_root_uri>/<job-name>/input/function.pkl',
        '--function_args_uri', 'storage://<storage_root_uri>/<job-name>/input/args.pkl',
        '--function_returns_uri', 'storage://<storage_root_uri>/<job-name>/return.pkl',
        '--function_exception_uri', 'storage://<storage_root_uri>/<job-name>/exception.pkl',
        '--storage_kms_key', '"<storage_kms_key_id>"'
    ]
},
RoleRn =<role (default or overridden using job decorator parameter)>,
ResourceConfig={
    'Instance Type':<instance_type>,
    'InstanceCount': <instance_count>,
    'VolumeSizeInGB': <colume_size>,
    'VolumeKmsKeyId': <volume_kms_key>,
    'KeepAlivePeriodInSeconds': <keep_alive_period_in_seconds>},
VpcConfig={
    'SecurityGroupIds': <security_group_ids>,
    'Subnets': <subnets>
},
```

```
StoppingCondition={
   'MaxRuntimeInSeconds': <max_runtime_in_seconds>,
},
Tags =<tags>,
Environment = <environment_variables>,
RetryStrategy={
   'MaximumRetryAttempts' : <max_retry_attempts>
},
```

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of a provider network 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

Figure 4:
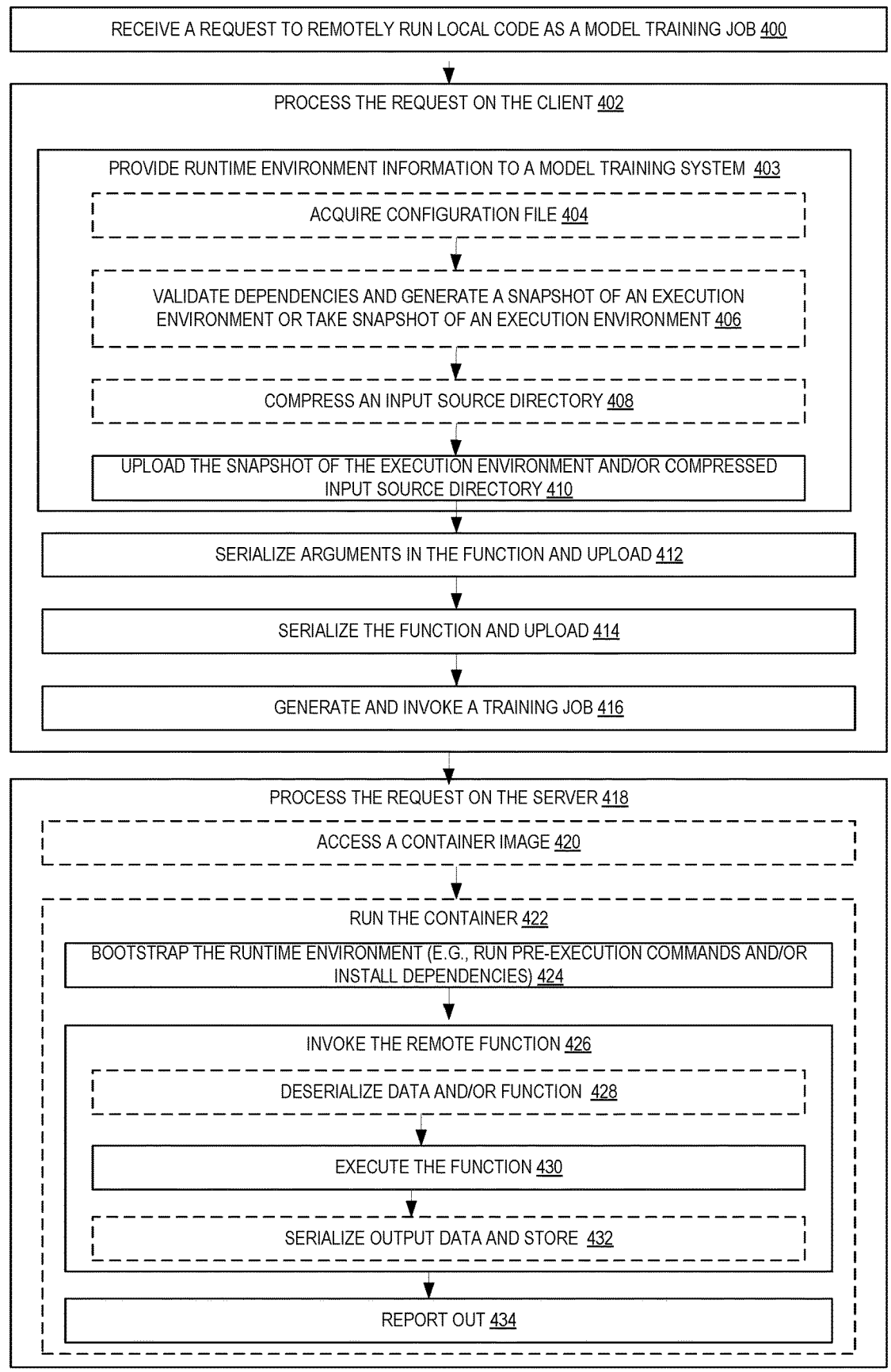
FIG. 4 is a flow diagram illustrating operations of a method for remote execution of a function according to some examples.

FIG. 4 is a flow diagram illustrating operations of a method for remote execution of a function according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the model training system 120 (including a using a remote job handler 122) and/or the remote compute module 164 of the other figures.

A request to remotely run local code as a model remote compute system job is received at 400. In some examples, this request is in the form of an invocation of API call or a decorator that is a part local code that is running. Note the code can be run from a client such as model training system studio application (e.g., an IDE that is a part of a model training system), a model training system notebook, or a local IDE. In some examples, the request includes a request to use warm pooling.

The request is processed on the client at 402. A runtime environment for the model remote compute system job is customizable to match or mimic a local runtime environment in some examples. Runtime dependencies, including Python packages and environment variables for model remote compute jobs, can be specified to customize the runtime. To run local Python code as model training system managed jobs, the Python package and dependencies need to be made available to model training system. Networking and security configurations such as virtual private cloud (VPC), subnets, and security groups are also configurable in some examples for model remote compute jobs. The processing of the request may include one or more acts.

In some examples, runtime environment information including package usage, dependencies, input source directory data, etc. are uploaded to the model training system at 403.

In some examples, at least one configuration file is acquired, and an overall configuration file is generated at 404. For example, one or more runtime environment configuration files (e.g., a requirements.txt file and/or a package management system environment file) and/or an infrastructure configuration file are acquired, and an overall configuration is generated. This overall configuration file is used in the generation of the remote compute job.

Dependencies of the one or more configuration files are validated, and a snapshot of an execution environment is generated at 406. In some examples, a snapshot of an execution environment is generated at 406 when there are no configuration files and/or the configuration files cannot be validated.

An input source directory is compressed at 408 and the snapshot of the execution environment and/or compressed input source directory are uploaded to the model training system at 410. This information allows the model training system to replicate the local RT environment.

In some examples, arguments in the function to remotely run are serialized and uploaded to the model training system at 412. The function itself is serialized and uploaded to the model training system at 414. As noted above, the serialization, in some examples, and subsequent uploading is faster than copying all of the data and/or function code.

With the function, data, and RT environment provided to the model training system, a remote compute job is generated and invoked at 416.

In some examples, a remote compute job includes one or more of the following: a specification of a training algorithm (e.g., a path of a container image that contains the training algorithm and algorithm-specific metadata such as an input mode, a container entry point, and/or container arguments); a checkpoint configuration containing information about the output location for managed spot remote compute checkpoint data; a debug hook configuration containing information for a debugger hook parameters, metric and tensor collections, and storage paths; a debug rule configuration which containing information for rules for debugging output tensors; an indication of communications between containers are to be encrypted; an indication of if spot remote compute can be used such that managed spot jobs can be stopped and re-started; an indication of if the remote compute container is to be isolated (e.g., no inbound or outbound calls except to peers); an indication of environment variables to set in the remote compute container; one or more hyperparameters for the training algorithm; an input data configuration that describes input data (e.g., training and validation) and its location(s); an output data configuration specifies a location for the output (model artifacts)—note that in some examples, the output is serialized and returned to the client; a profiler configuration that indicates information for debugger monitoring, profiling, etc.; resource configuration information to indicate compute instances and/or storage to use for model remote compute; an indication of retry strategy (e.g., a number of times to retry the job); an indication of a IAM role; an indication of a stopping condition (e.g., a time limit); an array of key-value pairs of tags; a name of the remote compute job; an indication to use warm pooling (and a time frame); and/or a configuration of a VPC.

The invoked remote compute job is processed at the server side (the model training system) at 418. The processing of the invoked remote compute job may include one or more acts.

A container is accessed according to the remote compute job at 420. In particular, the container is pointed at by a URI in some examples. For example, specified container arguments (e.g., locations of previously uploaded configuration information, dependencies, the function, arguments of the function, for a return, for an exception, and a storage key) are used to build a container. Note that as this information was generated, a user does not have to learn how to build a container.

The container is run at 422. The running of the container may include one or more acts. In some examples, the runtime environment (e.g., run pre-execution commands and/or install dependencies as indicated in, for example, requirements.txt or a yaml file) is bootstrapped at 424. This bootstrapping replicates the local runtime based on the previously captured and uploaded RT information.

The remote function is invoked at 426. This invocation may result in several acts. For example, the uploaded source data and/or function (code and arguments) is/are uncompressed and/or deserialized at 428. The function is executed at 430 and output data is serialized and stored at 432. A report out is made at 434.

In some examples, if there is an error in the bootstrapping and/or function invocation, the error is serialized and stored, and a message is sent to the client. The error information can then be retrieved as needed.

Figure 5:
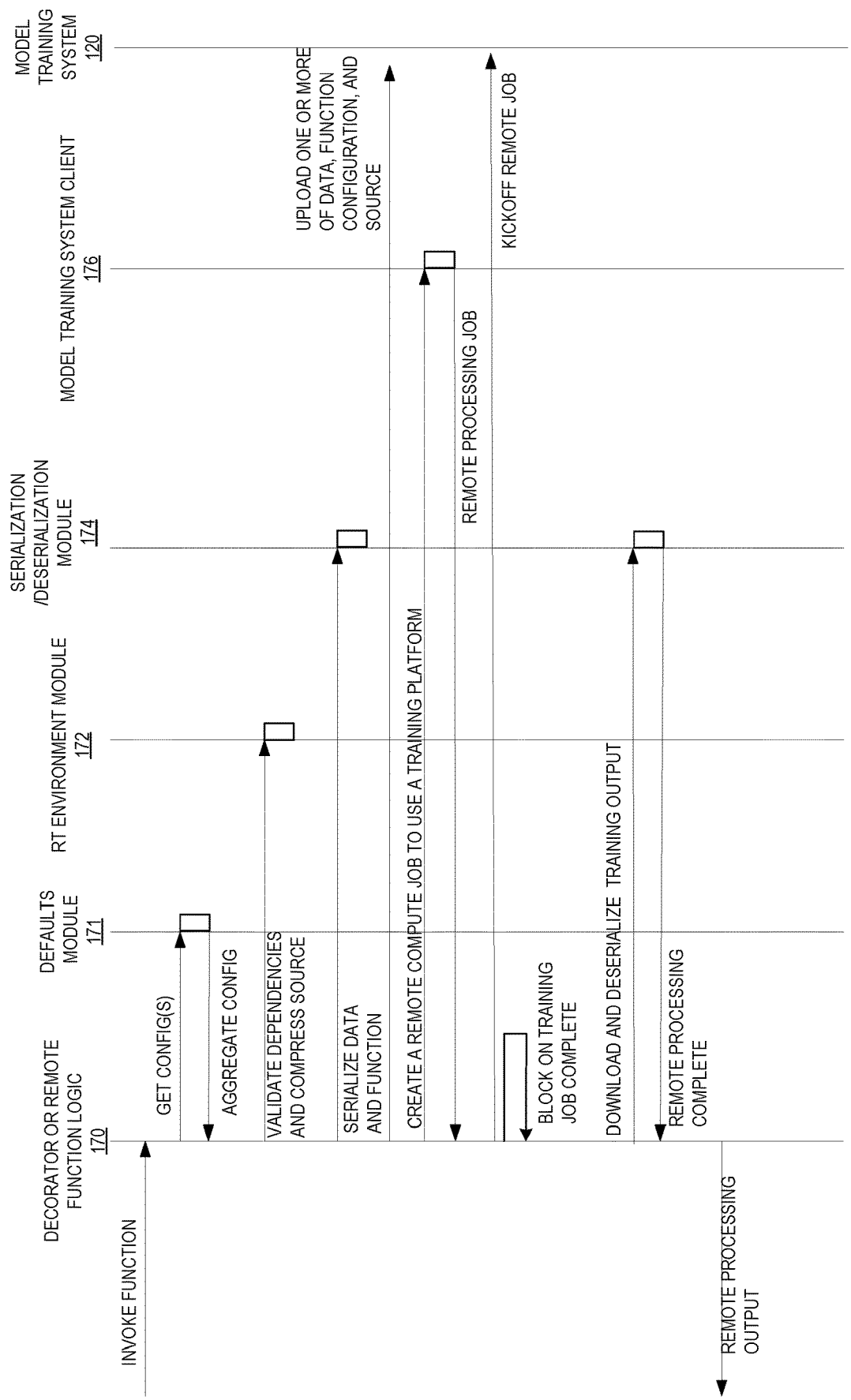
FIG. 5 illustrates examples of a flow diagram of actions taken by a remote compute module.

FIG. 5 illustrates examples of a flow diagram of actions taken by a remote compute module. As shown, a user causes a function to be invoked and handled by the decorator or remote function logic 170. The decorator or remote function logic 170 effectively acts as an orchestrator and calls several other modules.

In some examples, the decorator or remote function logic 170 calls the defaults module 171 to get the one or more configuration files and aggregate aspects into an aggregate (or overall) configuration file that overrides pre-defined configurations. Note that as detailed above, there may not be configurations to evaluate. The aggregate configuration is used in the creation of a remote compute job (e.g., by providing VPC, etc. information).

In some examples, the decorator or remote function logic 170 calls the RT environment module 172 to validate dependencies of the RT and compress any source locations. The compressed source(s) is/are uploaded to the model training system 120.

In some examples, the decorator or remote function logic 170 calls the SERDES module 174 to serialize data (arguments) of the function and the function itself and the serialized data and function are uploaded to the model training system 120.

In some examples, the decorator or remote function logic 170 calls the model remote compute system client 176 to create a remote compute job. In particular, one or more fields of the remote compute job definition are filled in using the aggregate configuration, dependency information, etc. The remote compute job is returned, stored at the model training system 120, and invoked at the model training system 120.

Until the remote compute job is complete, in some examples, the decorator or remote function logic 170 is blocked from further action. Upon receiving an indication that the remote compute is complete, the decorator or remote function logic 170 causes a download and deserialization of the remote compute output which is then provided to the requesting user.

Figure 6:
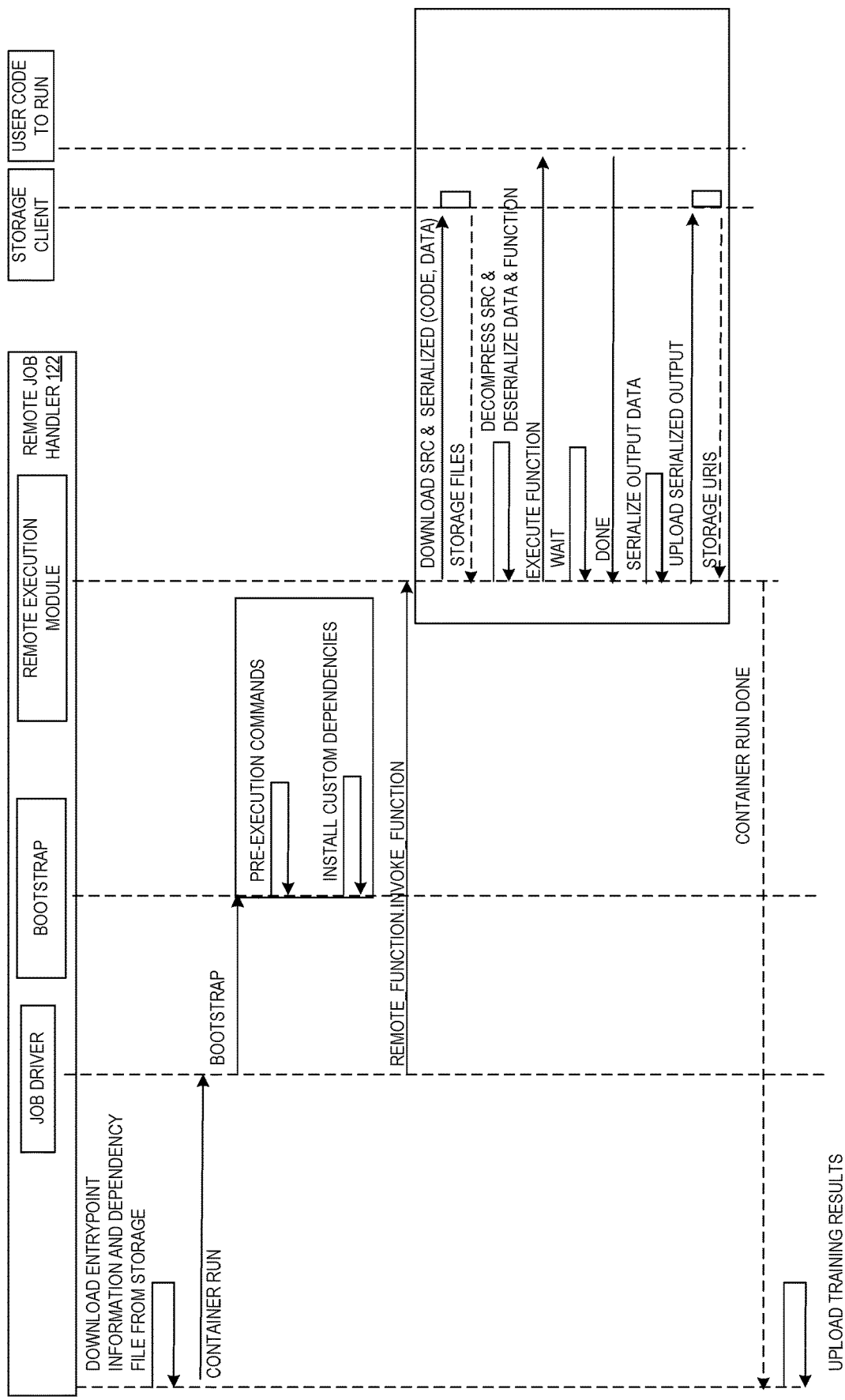
FIG. 6 illustrates examples of a flow diagram of actions taken by at least using a remote job handler to handle remote compute job request invocation.

FIG. 6 illustrates examples of a flow diagram of actions taken by at least using a remote job handler to handle remote compute job request invocation. In particular, remote job handler 122 and its acts are shown. Note that other actors (e.g., a storage client and user code of the remote compute job container) are also shown.

Upon receiving the remote compute job request, an entry pointed container (e.g., ContainerEntrypoint and ContainerArguments from the remote compute job request) and/or dependency file(s) are downloaded from storage. The entry point information has been previously uploaded.

A request to run the container is then made. To run the container, the RT is bootstrapped according to the local RT. The bootstrapping may include running pre-execution commands and/or installing custom dependencies (e.g., as indicated in requirements.txt for example).

With the RT up and running, the function is then invoked. The invocation includes downloading the stored serialized data and code and compressed source, deserializing the serialized data and code (function) and decompressing the source, executing the function, serializing the output of the execution of the function, and uploading the serialized output into storage.

The location of the storage is returned along with an indication that the running of the container is done.

Figure 7:
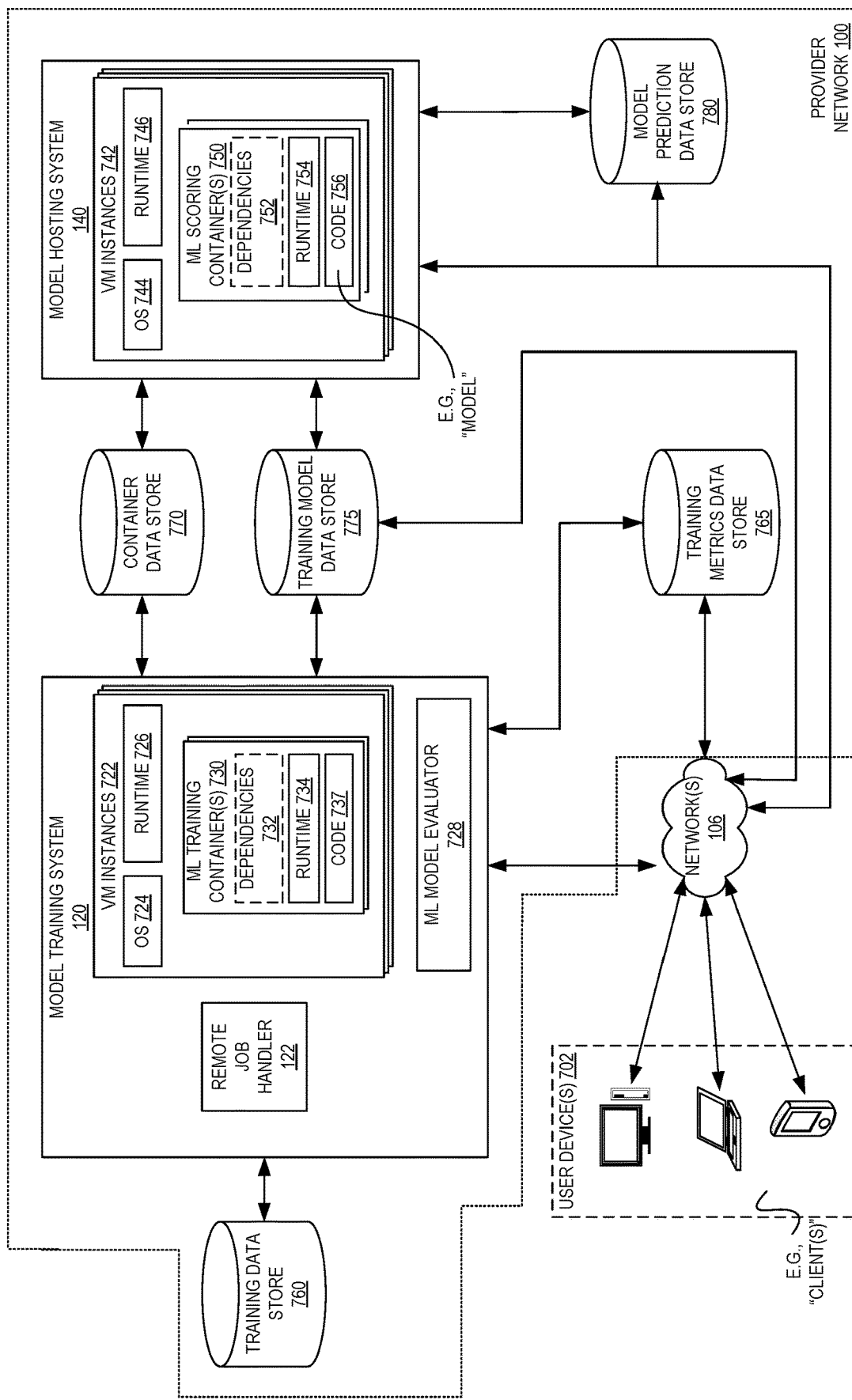
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s), edge device(s)), a model training system, a model hosting system, a training data store 760, a training metrics data store 765, a container data store 770, a training model data store 775, and a model prediction data store 780. Note that training data store 760 may be used for storing non-training data that is used during remote compute.

A machine learning service described herein may include one or more of these entities, such as the model hosting system 140, model training system 120, and so forth.

In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend of the model training system 120. For example, a user device 702 can provide a remote compute request to the frontend that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for remote compute, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the remote compute request, the user device 702 may provide, in the remote compute request, an algorithm written in any programming language. The model training system 120 then packages the algorithm into a container (optionally with other code, such as a "base" ML, algorithm supplemented with user-provided code) that is eventually loaded into a virtual machine instance 722 for remote compute a machine learning model, as described in greater detail below. For example, a user, via a user device 702, may develop an algorithm/code using an application (for example, an interactive web-based programming environment) and cause the algorithm/code to be provided—perhaps as part of a remote compute request (or referenced in a remote compute request)—to the model training system 120, where this algorithm/code may be containerized on its own or used together with an existing container having a machine learning framework, for example.

In some embodiments, instead of providing a container image in the remote compute request, the user device 702 provides, in the remote compute request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for remote compute a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of remote compute requests received from user devices 702 via frontend, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are used to execute tasks. For example, such tasks can include remote compute a machine learning model. As shown in FIG. 7, each virtual machine instance 722 includes an operating system (OS) 724, a language runtime 726, and one or more ML training containers 730 (which can be used for non-training remote compute purposes). Generally, the ML training containers 730 are logical units created within a virtual machine instance using the resources available on that instance and can be used to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737 (e.g., user code), and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or use) code or libraries from dependencies 732. The runtime 734 is configured to execute the code 737 in response to an instruction to begin machine learning model remote compute. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of remote compute data indicated by the remote compute request and select a machine learning model to train (for example, execute the executable instructions that represent an algorithm that defines the selected machine learning model) that corresponds with the identified type of remote compute data.

In some embodiments, the runtime 734 is the same as the runtime 726 used by the virtual machine instance 722. In some embodiments, the runtime 734 is different than the runtime 726 used by the virtual machine instance 722.

In some embodiments, the model training system 120 uses one or more container images included in a remote compute request (or a container image retrieved from the container data store 770 in response to a received remote compute request) to create and initialize a ML training container 730 in a virtual machine instance 722. For example, the model training system 120 creates a ML training container 730 that includes the container image(s) and/or a top container layer.

Prior to beginning the remote compute process, in some embodiments, the model training system 120 retrieves remote compute data from the location indicated in the remote compute request. For example, the location indicated in the remote compute request can be a location in the training data store 760. Thus, the model training system 120 retrieves the remote compute data from the indicated location in the training data store 760. In some embodiments, the model training system 120 does not retrieve the remote compute data prior to beginning the remote compute process. Rather, the model training system 120 streams the remote compute data from the indicated location during the remote compute process. For example, the model training system 120 can initially retrieve a portion of the remote compute data and provide the retrieved portion to the virtual machine instance 722 remote compute the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the remote compute data and provide the second retrieved portion to the virtual machine instance 722, and so on.

To perform the machine learning model remote compute, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the remote compute request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model remote compute process, where the remote compute process is run using the hyperparameter values included in the remote compute request. Execution of the executable instructions can include the virtual machine instance 722 applying the remote compute data retrieved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of remote compute a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once remote compute is complete and store the single file in the training model data store 775. Alternatively, the virtual machine instance 722 stores the multiple files in the training model data store 775. The virtual machine instance 722 stores the file(s) in the training model data store 775 while the remote compute process is ongoing and/or after the remote compute process is complete.

In some embodiments, the virtual machine instance 722 regularly stores model data file(s) in the training model data store 775 as the remote compute process is ongoing. Thus, model data file(s) can be stored in the training model data store 775 at different times during the remote compute process. Each set of model data files corresponding to a particular time or each set of model data files present in the training model data store 775 as of a particular time could be checkpoints that represent different versions of a partially-trained machine learning model during different stages of the remote compute process. Accordingly, before remote compute is complete, a user, via the user device 702 can submit a deployment and/or execution request in a manner as described below to deploy and/or execute a version of a partially trained machine learning model (for example, a machine learning model trained as of a certain stage in the remote compute process). A version of a partially trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the remote compute process. Thus, the model training system 120 can create multiple copies of the container image provided in a remote compute request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively remote compute a machine learning model and that a particular ML training container 730 receiving the configuration information is ML training container 730 number X of N), which can be included in the resulting model data. By parallelizing the remote compute process, the model training system 120 can significantly reduce the remote compute time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the remote compute process. Thus, the model training system 120 can create multiple copies of the container image provided in a remote compute request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively remote compute a machine learning model and that a particular ML training container 730 receiving the configuration information is ML training container 730 number X of N, information indicating that M virtual machine instances 722 are collectively remote compute a machine learning model and that a particular ML training container 730 receiving the configuration information is initialized in virtual machine instance 722 number Y of M, etc.), which can be included in the resulting model data. As described above, by parallelizing the remote compute process, the model training system 120 can significantly reduce the remote compute time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the remote compute process and stores the model metrics in the remote compute metrics data store 765 in some embodiments. While the machine learning model is being trained, a user, via the user device 702, can access and retrieve the model metrics from the remote compute metrics data store 765. The user can then use the model metrics to determine whether to adjust the remote compute process and/or to stop the remote compute process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model remote compute process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model remote compute process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model remote compute in ML training container(s) 730) in response to remote compute requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are used to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be used to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 used by the virtual machine instance 742. In some embodiments, runtime 754 is different than the runtime 746 used by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend processes all remote compute requests received from user devices 702 and provisions virtual machine instances 722. In some embodiments, the frontend serves as a front door to all the other services provided by the model training system 120. The frontend processes the requests and makes sure that the requests are properly authorized. For example, the frontend may determine whether the user associated with the remote compute request is authorized to initiate the remote compute process.

Similarly, frontend processes all deployment and execution requests received from user devices 702 and provisions virtual machine instances 742. In some embodiments, the frontend serves as a front door to all the other services provided by the model hosting system 140. The frontend processes the requests and makes sure that the requests are properly authorized. For example, the frontend may determine whether the user associated with a deployment request or an execution request is authorized to access the indicated model data and/or to execute the indicated machine learning model.

The training data store 760 stores remote compute data and/or evaluation data. The remote compute data can be data used to train machine learning models and evaluation data can be data used to evaluate the performance of machine learning models. In some embodiments, the remote compute data and the evaluation data have common data. In some embodiments, the remote compute data and the evaluation data do not have common data. In some embodiments, the remote compute data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting remote compute requests, deployment requests, and/or execution requests. In some embodiments, the user devices 702 can execute a stand-alone application that interacts with the model training system 120 and/or the model hosting system 140 for submitting remote compute requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some examples, the model training system 120 supports multiple ways of custom code execution. In some examples, a "Script Mode" allows a user using a particular SDK to install custom dependences by having a requirements.txt file in their code directory. Script mode is handwritten and unless all of the packages that the code is dependent on are in the requirements.txt file errors will occur. There is no way to validate the dependencies until the code is run. In some examples, a user builds a container image for a fully custom runtime, but the user has to learn how to build the image, the model training system 120 contract to run the container, and how to maintain the image.

Examples detailed herein capture what a user is using on a local machine for a runtime and replicate that runtime on the server (job) side. These examples do not require learning how to build and manage a container image, nor do they require a proper requirements.txt configuration. In some examples, a default or model training system 120 provided image comes with a virtual environment setup that contains the pre-requisite packages for a user to get started with development. Once there is a virtual environment established in the user's development environment, the SDK and model training system 120 can capture the state of the user's virtual environment and replicate it during the remote compute. In some examples, a user may explicitly provide a yaml or requirements.txt along with a container image that forms the custom runtime environment for the training job as described above. In some examples, a user may explicitly provide a yaml or requirements.txt and a model training system 120 supplied image will form the custom runtime environment for the training job as described above.

Figure 8:
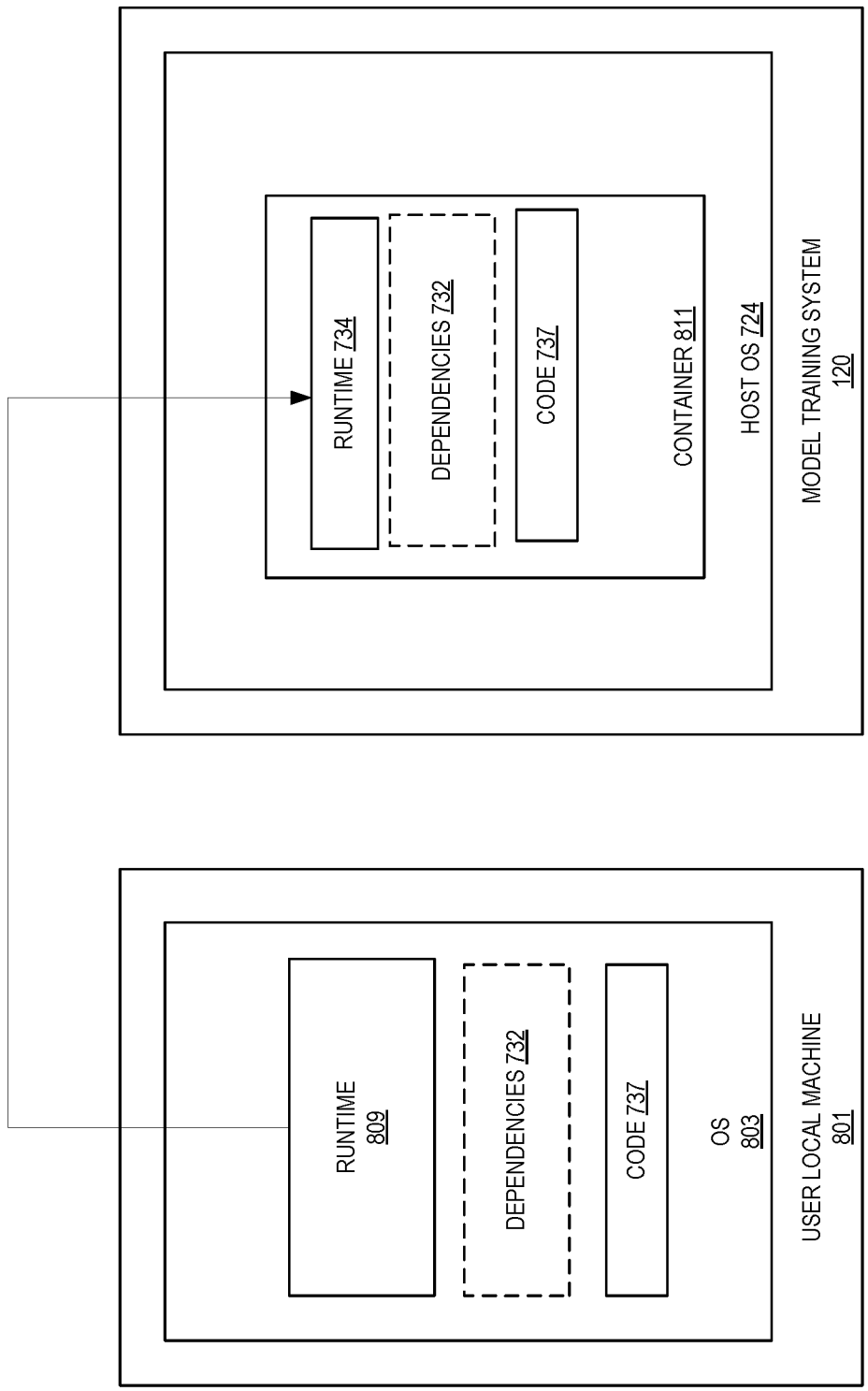
FIG. 8 illustrates examples of a runtime replication from a local machine to a model training system.

FIG. 8 illustrates examples of a runtime replication from a local machine to a model training system. In some examples, the user local machine 801 runs a virtualized environment. As shown, an operating system (OS) 803 of the user local machine 801 executes a runtime 809. This runtime 809 is duplicated on the model training system 120 which uses containers.

A container image is a standalone executable package of software that includes everything needed to run an application such as code, runtime, system tools, system libraries, and settings. A container image becomes a container at runtime. Multiple containers can run on the same machine and share an operating system (OS) kernel with other containers. Each container will run as an isolated process in user space.

As shown, a host OS 724 is an operating system on which a container client and daemon run. In some examples, the host OS 724 shares its kernel with running containers (using a container OS or engine such as Docker®) and in other examples each container has its own kernel.

In some examples, a container image includes instructions for creating a container (runnable instance) that uses aspects of an operating system (e.g., Linux, Windows®, etc.). In some examples, a container image starts from a base image that is an empty first layer that allows for the building of a container image from scratch. A container image contains a plurality of files or layers that may be built on each other (like a stack). A container 811 is a runnable instance of a container image.

In this example, the container 811 includes code 737 to execute, installed dependencies 732, and the replicated runtime 734. In some examples, as noted above, a remote decorator or remote function logic defines one or more parameters including dependencies to install for a runtime (such as the runtime 809). These dependencies are gathered by the decorator or remote function logic and information about the dependencies is included in the remote compute job request so that the runtime 734 can replicate the runtime 809. In some examples, when dependencies are used, a path to a package management system (PMS) is provided. In some examples, dependencies are installed from a YAML file when a package management system is used.

In some examples, if job_pms_env is set, then the PMS environment is updated by installing dependencies from the yaml file and the function is invoked within that PMS environment. For this to succeed, the specified PMS environment should already exist in the image. When the PMS environment does not exist, a new PMS environment is created and the function annotated with the remote decorator is invoked in that PMS environment.

In some examples, when dependencies are used, a path to a requirements.txt file (e.g., a file that lists packages and versions used) is provided. Dependencies may be installed within a package management system or at a system level. If job_pms_env is set in the remote decorator, dependencies are installed within that PMS environment and the function annotated with the remote decorator is invoked in the same PMS environment. For this to succeed, the specified PMS environment should already exist in the image. If the PMS environment is not specified, then the PMS environment is not used and dependencies are installed at the system level, without any virtual environment, and the function annotated with the remote decorator is invoked using the runtime available in the system path.

In some examples, when dependencies are used, and dependency use is set to automatic, a current package management system's snapshot is used. A dependency file is not needed. If job_pms_env is set, then the PMS environment is updated by installing dependencies from the yaml file and the function is invoked within that PMS environment. For this to succeed, the specified PMS environment should already exist in the image. If the PMS environment does not existed, then a new PMS environment is created and the function annotated with the remote decorator is invoked in that PMS environment.

Figure 9:
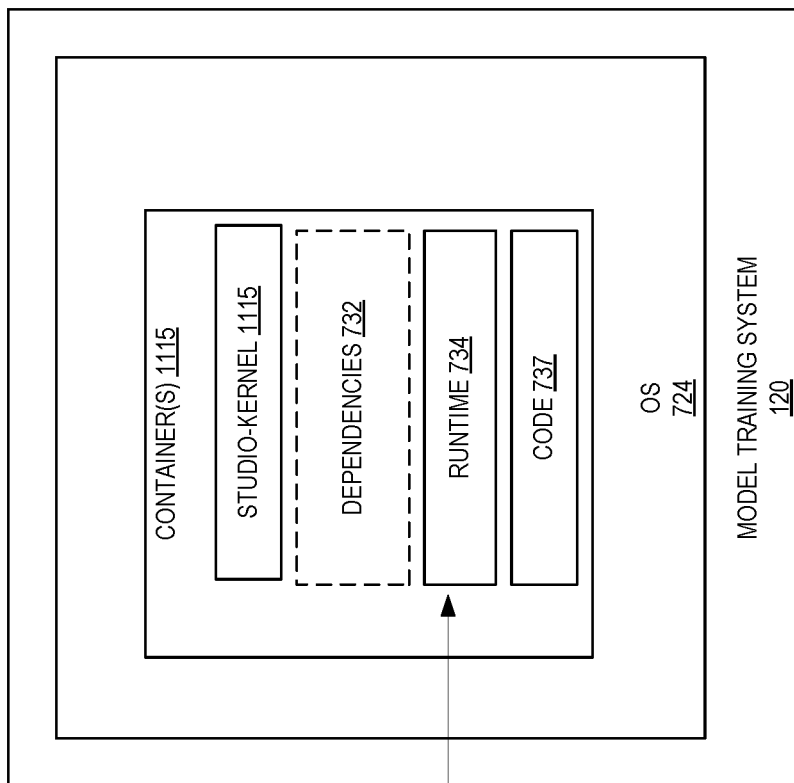
FIG. 9 illustrates examples of a runtime replication from a container to a model training system that uses a container.
Figure 9:
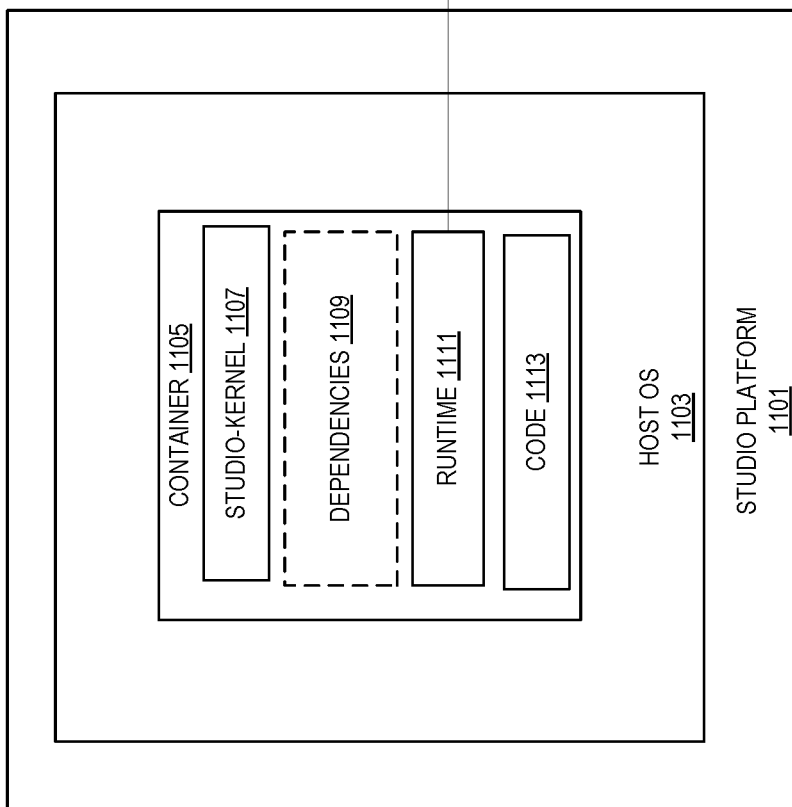

FIG. 9 illustrates examples of a runtime replication from a container to a model training system that uses a container. In some examples, a studio platform 901 of a provider network runs a container OS 905 a virtualized environment of an OS 903. The container includes a studio kernel 907, dependencies 909, runtime 911, and code 913. The runtime 911 is duplicated on the model training system 120 which also uses containers.

In this example, the model training system 120 container 915 includes code 737 to execute, installed dependencies 732, and the replicated runtime 734. In some examples, the container 915 includes a studio kernel 915. In some examples, as noted above, a remote decorator or remote function logic defines one or more parameters including dependencies to install for a runtime (such as the runtime 911). These dependencies are gathered by the decorator or remote function logic and information about the dependencies is included in the remote compute job request so that the runtime 734 can replicate the runtime 911.

As noted above, the decorator or API includes dependencies and environmental variable information as a part of its provided parameters. Detailed in the next few paragraphs are examples of how that dependency information and/or environmental variable information may be used.

In some examples, when dependencies are used, a path to a PMS environmental YAML file is provided. In some examples, dependencies are installed from a YAML file when a package management system is used. In some examples, if the JobPMSEnvironment (or JobCondaEnvironment) is set, then the PMS environment is updated by installing dependencies from the yaml file and the function is invoked within that PMS environment. For this to succeed, the specified PMS environment should already exist in the image. In some examples, if an environment variable is set in an image to use, then the PMS environment is updated by installing dependencies from the yaml file and the function is invoked within that PMS environment. For this to succeed, the specified PMS environment should already exist in the image. When the PMS environment does not exist, a new PMS environment is created and the function annotated with the remote decorator or API is invoked in that PMS environment.

In some examples, when dependencies are used, a path to a requirements.txt file (e.g., a file that lists packages and versions used) is provided. Dependencies may be installed within a package management system or at a system level. If job_pms_env is set in the remote decorator or API, dependencies are installed within that PMS environment and the function annotated with the remote decorator or API is invoked in the same PMS environment. For this to succeed, the specified PMS environment should already exist in the image. If an environment variable is set in the image to use, then the PMS environment is updated by installing dependencies from the yaml file and the function is invoked within that PMS environment. For this to succeed, the specified PMS environment should already exist in the image. If none of the above conditions for requirements.txt are set, then a PMS is not used and dependencies are installed at the system level, without any virtual environment, and the function annotated with the remote decorator or API is invoked using the runtime available in the system path.

In some examples, when dependencies are used, and dependency use is set to automatic, a current package management system's snapshot is taken to set dependencies. A dependency file is not needed. If job_pms_env is set, then the PMS environment is updated by installing dependencies from the yaml file and the function is invoked within that PMS environment. For this to succeed, the specified PMS environment should already exist in the image. If the PMS environment does not exist, then a new PMS environment is created and the function annotated with the remote decorator or API is invoked in that PMS environment.

Figure 10:
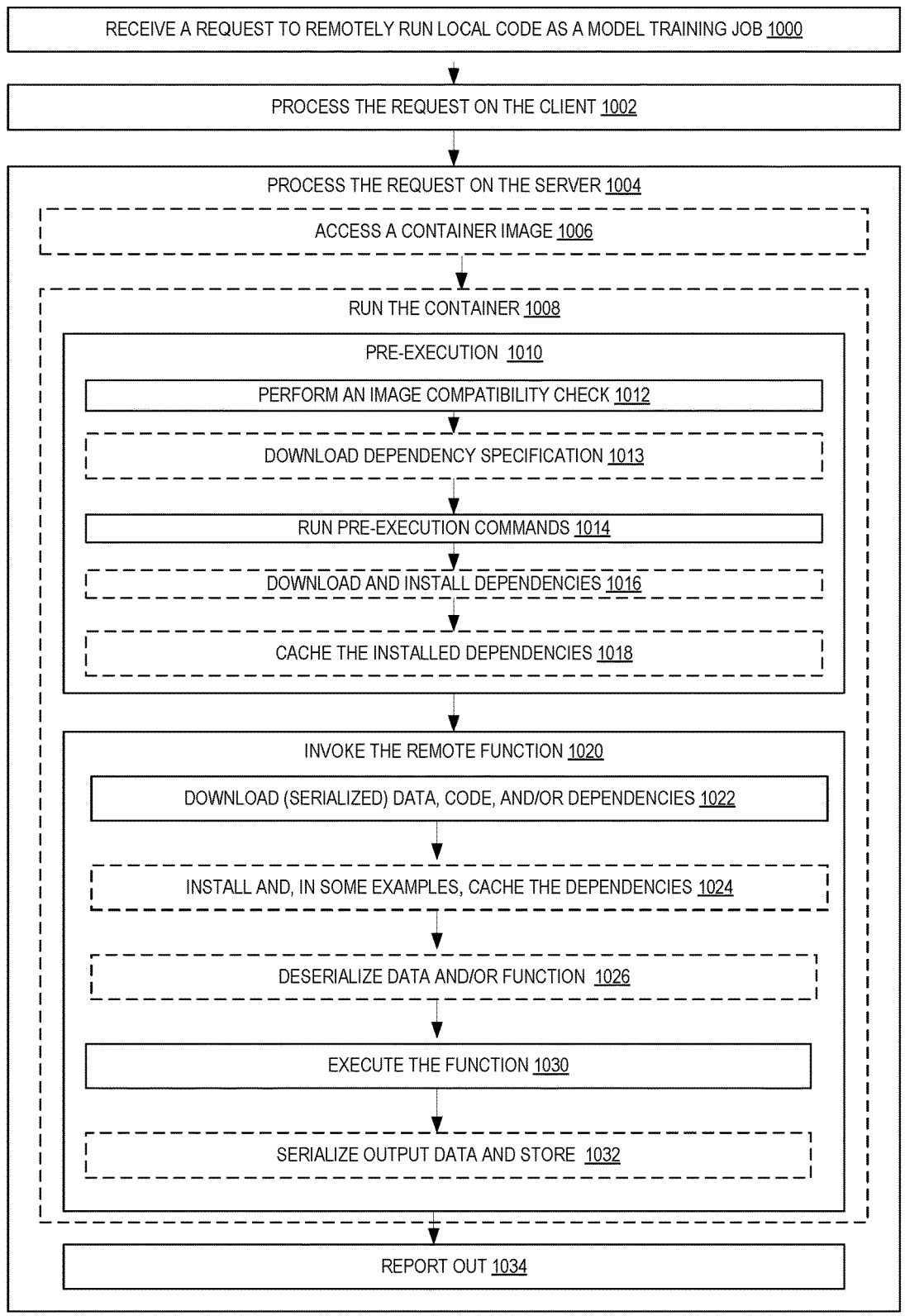
FIG. 10 is a flow diagram illustrating operations of a method for remote execution of a function according to some examples.

FIG. 10 is a flow diagram illustrating operations of a method for remote execution of a function according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the model training system 120 (including a using a remote job handler 122) and/or the remote compute module 164 of the other figures.

A request to remotely run local code as a model remote compute system job is received at 1000. In some examples, this request is in the form of an invocation of API call or a decorator that is a part local code that is running. Note the code can be run from a client such as model training system studio application (e.g., an IDE that is a part of a model training system), a model training system notebook, or a local IDE. In some examples, the request includes a request to use warm pooling.

The request is processed on the client at 1002. A runtime environment for the model remote compute system job is customizable to match or mimic a local runtime environment in some examples. Runtime dependencies, including Python packages and environment variables for model remote compute jobs, can be specified to customize the runtime. To run local Python code as model training system managed jobs, the Python package and dependencies need to be made available to model training system. Networking and security configurations such as virtual private cloud (VPC), subnets, and security groups are also configurable in some examples for model remote compute jobs. The processing of the request may include one or more acts. Examples of these acts are discussed with respect to block 402 of FIG. 4.

In some examples, a remote compute job includes one or more of the following: a specification of a training algorithm (e.g., a path of a container image that contains the training algorithm and algorithm-specific metadata such as an input mode, a container entry point, and/or container arguments); a checkpoint configuration containing information about the output location for managed spot remote compute checkpoint data; a debug hook configuration containing information for a debugger hook parameters, metric and tensor collections, and storage paths; a debug rule configuration which containing information for rules for debugging output tensors; an indication of communications between containers are to be encrypted; an indication of if spot remote compute can be used such that managed spot jobs can be stopped and re-started; an indication of if the remote compute container is to be isolated (e.g., no inbound or outbound calls except to peers); an indication of environment variables to set in the remote compute container; one or more hyperparameters for the training algorithm; an input data configuration that describes input data (e.g., training and validation) and its location(s); an output data configuration specifies a location for the output (model artifacts)—note that in some examples, the output is serialized and returned to the client; a profiler configuration that indicates information for debugger monitoring, profiling, etc.; resource configuration information to indicate compute instances and/or storage to use for model remote compute; an indication of retry strategy (e.g., a number of times to retry the job); an indication of a IAM role; an indication of a stopping condition (e.g., a time limit); an array of key-value pairs of tags; a name of the remote compute job; an indication to use warm pooling (and a time frame), and/or a configuration of a VPC.

The invoked remote compute job is processed at the server side (the model training system) at 1004. The processing of the invoked remote compute job may include one or more acts.

A container is accessed according to the remote compute job at 1006. In particular, the container is pointed at by a URI in some examples. For example, specified container arguments (e.g., locations of previously uploaded configuration information, dependencies, the function, arguments of the function, for a return, for an exception, and a storage key) are used to build a container. Note that as this information was generated, a user does not have to learn how to build a container.

The container is run at 1008. The running of the container may include one or more acts. In some examples, a pre-execution stage 1010 performs one or more acts. In some examples, an image compatibility check is performed at 1012. For example, is the type of image used supported by a particular SDK version and/or hardware.

A dependency specification (e.g., requirements.txt or YAML file) is downloaded at 1013 in some examples.

In some examples, pre-execution commands are run at 1014.

In some examples, dependencies (as indicated by the dependency specification) are downloaded and installed at 1016. These dependencies may be indicated in, for example, a requirements.txt or a yaml. In some examples, a PMS is also activated as detailed above. In some examples, if warm pooling has been requested, the installed dependencies are cached at 1018. In some examples, the caching is on the training host.

The remote function is invoked at 1020. This invocation may result in several acts. For example, the uploaded source data, function (code and arguments), and/or dependencies is/are downloaded at 1022. In some examples, custom dependencies (as indicated by the dependency specification) are installed and/or cached (if warm pooling has been requested) at 1024. In some examples, a PMS is also activated as detailed above.

The downloaded source data and function (code and arguments) uncompressed and/or deserialized at 1026.

The function is executed at 1030 and output data is serialized and stored at 1032. A report out is made at 1034.

In some examples, if there is an error in the pre-execution and/or function invocation, the error is serialized and stored, and a message is sent to the client. The error information can then be retrieved as needed.

Figure 11:
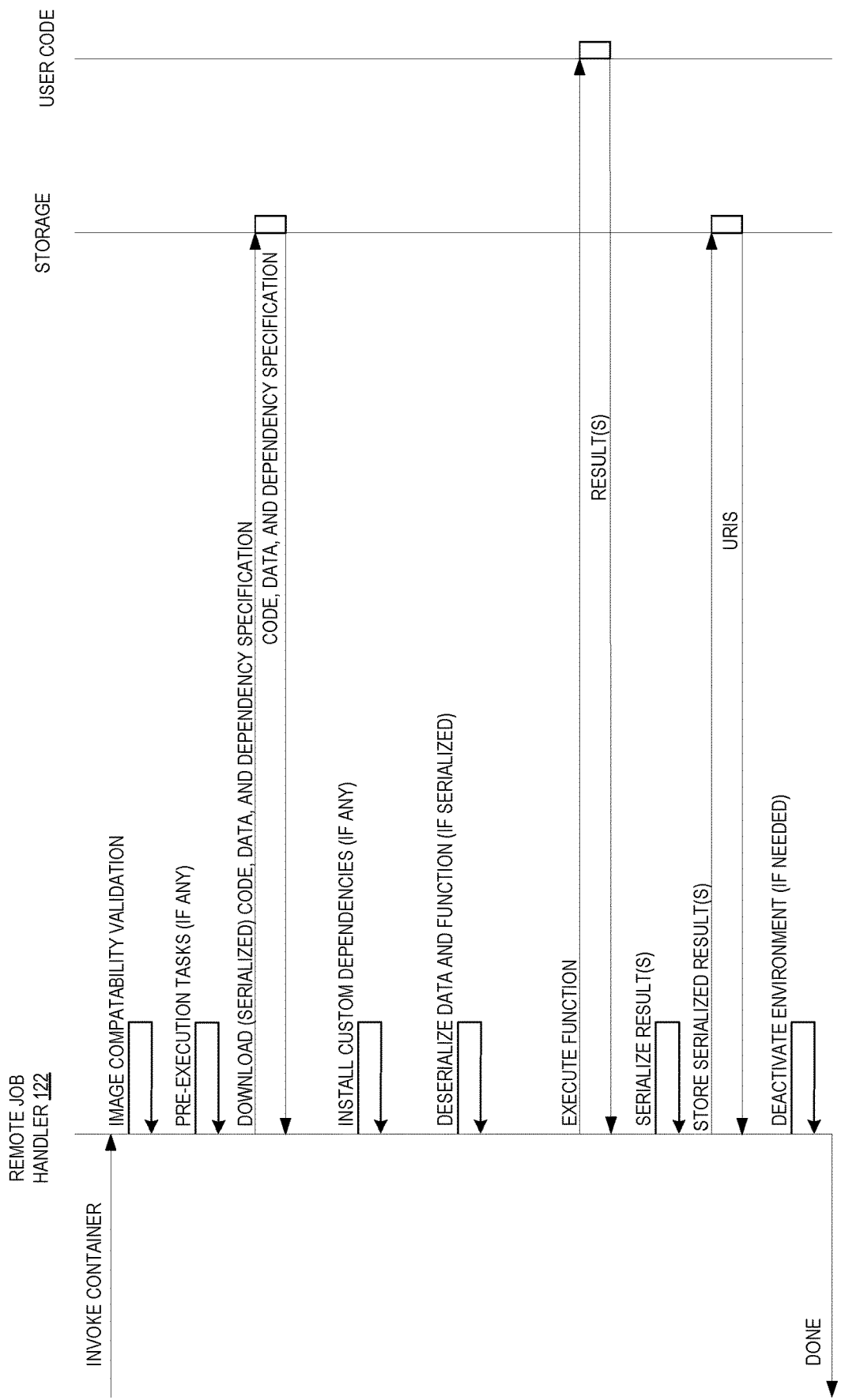
FIG. 11 illustrates examples of a flow diagram of actions taken by at least using a remote job handler to handle remote compute job request invocation.

FIG. 11 illustrates examples of a flow diagram of actions taken by at least using a remote job handler to handle remote compute job request invocation. In particular, remote job handler 122 and its acts are shown. Note that other actors (e.g., a storage client and user code of the remote compute job container) are also shown. What is not shown is upon receiving the remote compute job request, entry pointed container (e.g., ContainerEntrypoint and ContainerArguments from the remote compute job request) is downloaded from storage.

The container image is validated (and if validation fails the process stops) and pre-execution tasks as dictated by the job are performed.

Code, data, and a dependency specification are downloaded from storage and de-serialized or decompressed.

Custom dependencies are installed (e.g., using the dependency specification) and a PMS environment is activated if needed as discussed above to start the RT. Installed dependencies may also be cached.

With the RT up and running, the function is then. The invocation includes executing the function, serializing the output of the execution of the function, and uploading the serialized output into storage. In some examples, an activated PMS is deactivated.

The location of the storage is returned along with an indication that the running of the container is done.

The installation of dependency packages required to run custom code adds latency to the job. For example, in some environments the start-up latency can take over a minute. In some examples this latency is reduced by updating images (e.g., default images) provided the model training system 120 to include one or more package managers and/or environment managers (e.g., conda environments) to avoid re-installation of basic framework libraries. In some instances, this inclusion reduces startup latency by up to ⅔.

In some examples, a user specifies a desire to have "warm pools" of resources (e.g., initialized instances) that allow for a reduced start-up latency between training jobs. In some examples, a training job request includes a "Keep Alive" (e.g., KeepAlivePeriodInSeconds") for a period of time indication and, in some cases, a value for the period of time. This value represents the duration of time to retain configured resources in a warm pool for subsequent training jobs. Further, if several training jobs using similar configurations are to be run, a dedicated persistent cache directory can be used to store and re-use information (for example, re-use information in a different job)

In some examples, a warm pool is available for use until a matching job for reuse is found or the time period expires. In some examples, when a second job with matching specifications such as instance count or instance type is found, then the warm pool is moved from the first job to the second job for reuse. The status of the first warm pool is "reused." The status of the second job that reused the warm pool is "in use" and a new keep alive period is applied. When a warm pool is no longer available to reuse, the warm pool status is "terminated."

In some examples, the when a job after a cluster is stopped after it has been launched, a warm pool is still retained. In some examples, if the training job fails due to an algorithm or client error, a warm pool is still retained. In some examples, if the training job fails for any other reason that might compromise the health of the cluster, then the warm pool is not created.

For a warm pool to persist, a matching job should be found within the time specified in keep alive value. The next job is a match if the following values are identical:
RoleRn
ResourceConfig values:
  InstanceCount
  InstanceType
  VolumeKmsKeyId
  VolumeSizeInGB
VpcConfig values:
  SecurityGroupIds
  Subnets
EnableInterContainerTrafficEncryption
EnableNetworkIsolation All of these values must be the same for a warm pool to move to a subsequent job for reuse. In some examples, each subsequent job must also specify a "keep alive" value.

Figure 12:
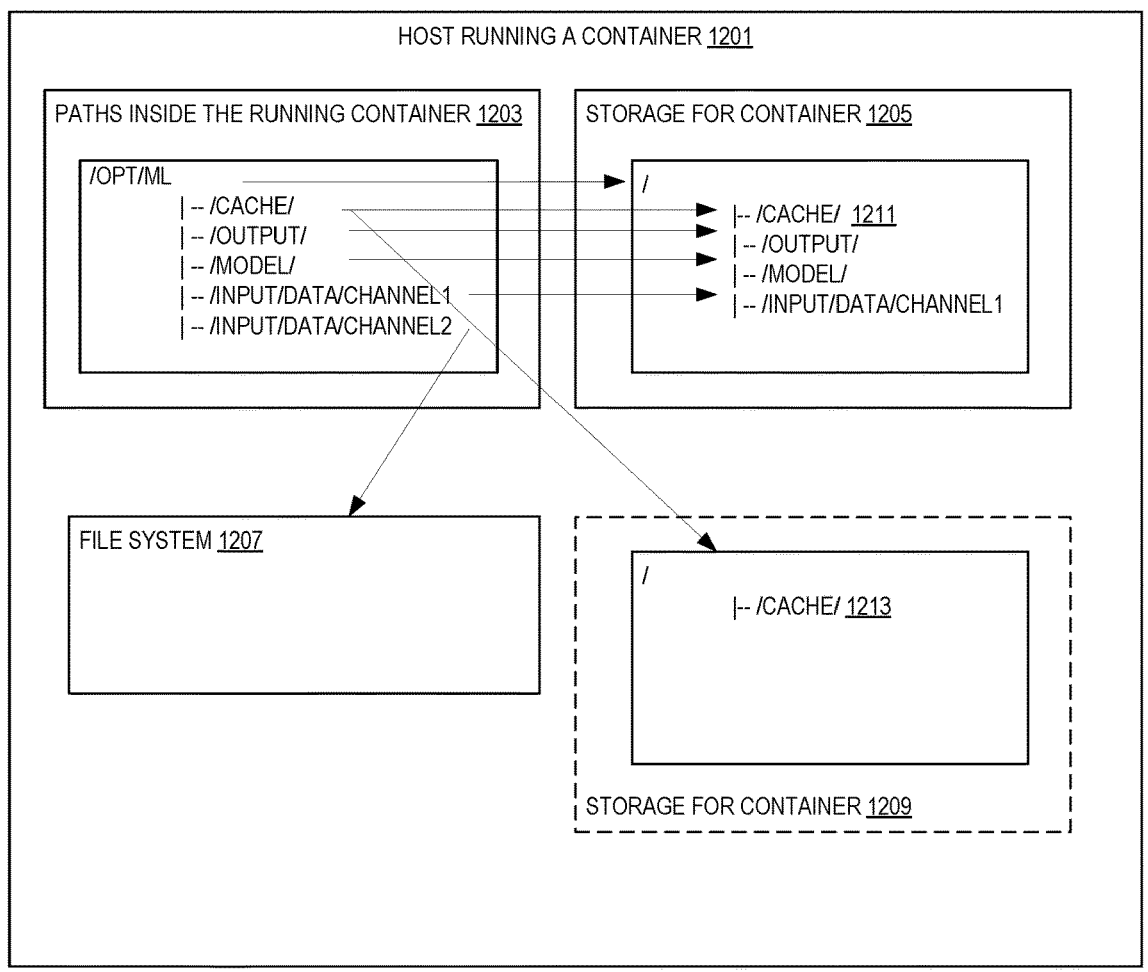
FIG. 12 illustrates examples of a host running a container that uses caching.

FIG. 12 illustrates examples of a host running a container that uses caching. As shown, a running container 1203 (on a host running the container 1201) has a plurality of paths to various the storage implementations including storage 1205, storage 1209, and/or a file system 1207. In some examples, when a warm pool is created, a special cache directory is mounted on a volume that will persist throughout the lifecycle of the warm pool. This is shown in the /CACHE/ of the paths inside the running container 1203 that maps to a storage for the container 1205 that has other data or /CACHE/ in a that is stored in storage for the container 1209 separate from the other data. This directory can also be used to store information that to re-use in another job. Using a persistent cache can reduce latency and billable time over using warm pools alone for jobs that require the following: multiple interactions with similar configurations, incremental jobs, and/or hyperparameter optimization.

In some examples, the cache directory can have subdirectories. Examples of types of information that can put be put in a persistent cache to help reduce latency include, but are not limited to one or more of: dependencies managed by pip, dependencies managed by conda, checkpoint information, and/or any additional information generated during remote compute.

In some examples, the cache is excluded from any removal of other folders that usually happens after each training job. In some examples, a separate volume is mounted to store the cache directory such that is persistently mounted without needed to worry about removal. In some examples, the separate volume approach removes the directory after the keep alive period expires.

In some examples, there are two mounted directories—one for persistent and another for ephemeral. The model, output, and input information is bound to both. The cache is stored in the persistent directory. After a training job completes the ephemeral directory is removed. The persistent directory is not removed until the expiration of the keep alive time period.

Figure 13:
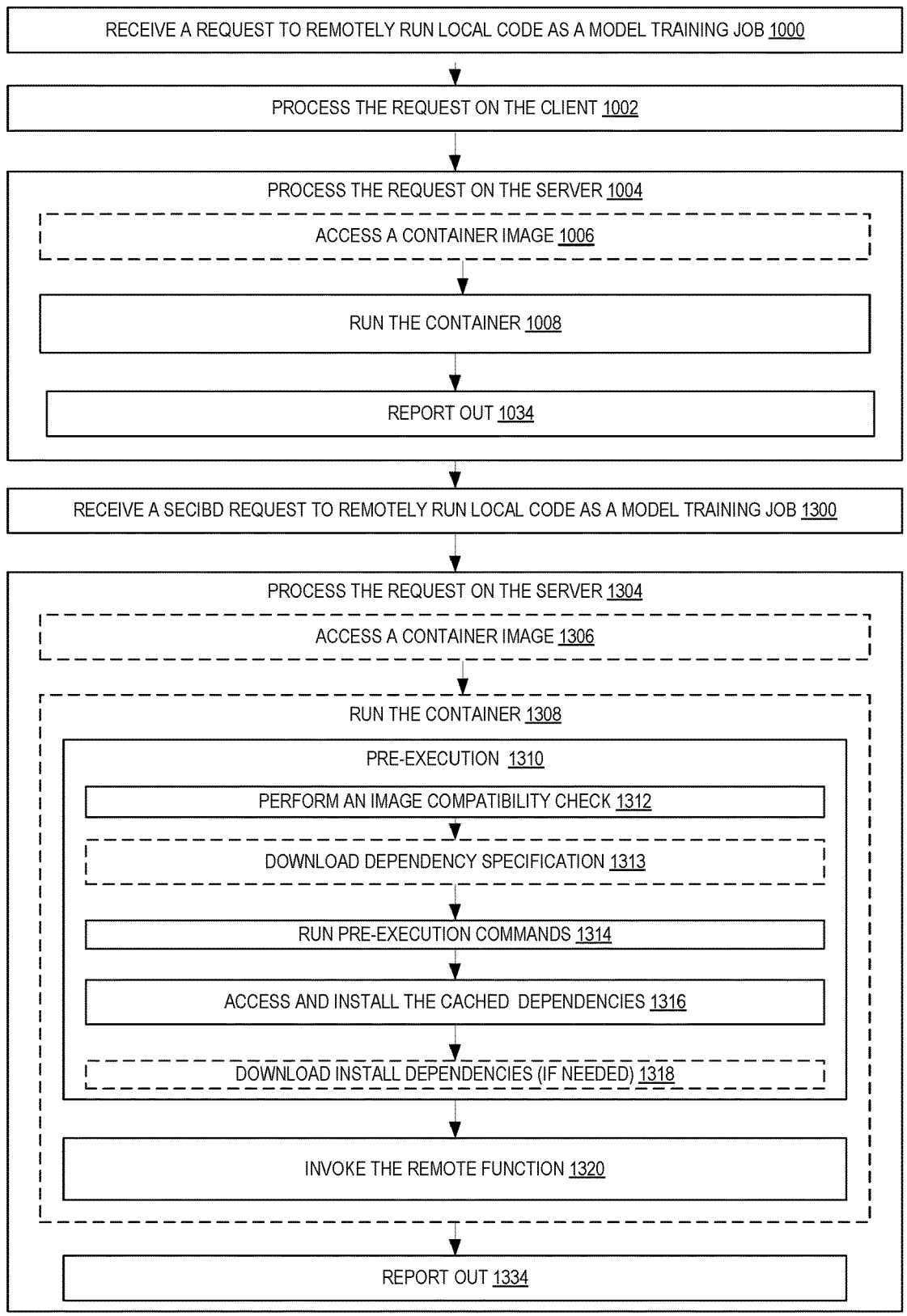
FIG. 13 is a flow diagram illustrating operations of a method for remote execution of a function using at least dependency caching according to some examples.

FIG. 13 is a flow diagram illustrating operations of a method for remote execution of a function using at least dependency caching according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the model training system 120 (including a using a remote job handler 122) and/or the remote compute module 164 of the other figures. Some numbers in this figure are the same as FIG. 10 and the description of those aspects corresponds to the previous descriptions and is not repeated here.

A second request to remotely run local code as a model remote compute system job is received at 1300. In some examples, this request is in the form of an invocation of API call or a decorator that is a part local code that is running. Note the code can be run from a client such as model training system studio application (e.g., an IDE that is a part of a model training system), a model training system notebook, or a local IDE. In some examples, the request includes a request to use warm pooling. This request should be received with the keep alive period with matching parameters to use the warm pool.

The invoked remote compute job is processed at the server side (the model training system) at 1304. The processing of the invoked remote compute job may include one or more acts.

A container is accessed according to the remote compute job at 1306. In particular, the container is pointed at by a URI in some examples. For example, specified container arguments (e.g., locations of previously uploaded configuration information, dependencies, the function, arguments of the function, for a return, for an exception, and a storage key) are used to build a container. Note that as this information was generated, a user does not have to learn how to build a container.

The container is run at 1308. The running of the container may include one or more acts. In some examples, a pre-execution stage 1010 performs one or more acts. In some examples, an image compatibility check is performed at 10312. For example, is the type of image used supported by a particular SDK version and/or hardware.

A dependency specification (e.g., requirements.txt or YAML file) is downloaded at 10313 in some examples.

In some examples, pre-execution commands are run at 1314.

Cached dependencies are accessed and installed, if needed, at 1316. In some examples, this happens only if the keep alive timer has not expired.

In some examples, dependencies (as indicated by the dependency specification) are downloaded and installed if they are not cached (or the keep alive timer has not expired) at 1316. These dependencies may be indicated in, for example, a requirements.txt or a yaml. In some examples, a PMS is also activated as detailed above.

The remote function is invoked at 1320.

In some examples, if there is an error in the pre-execution and/or function invocation, the error is serialized and stored, and a message is sent to the client. The error information can then be retrieved as needed.

A report out is made at 1034.

Figure 14:
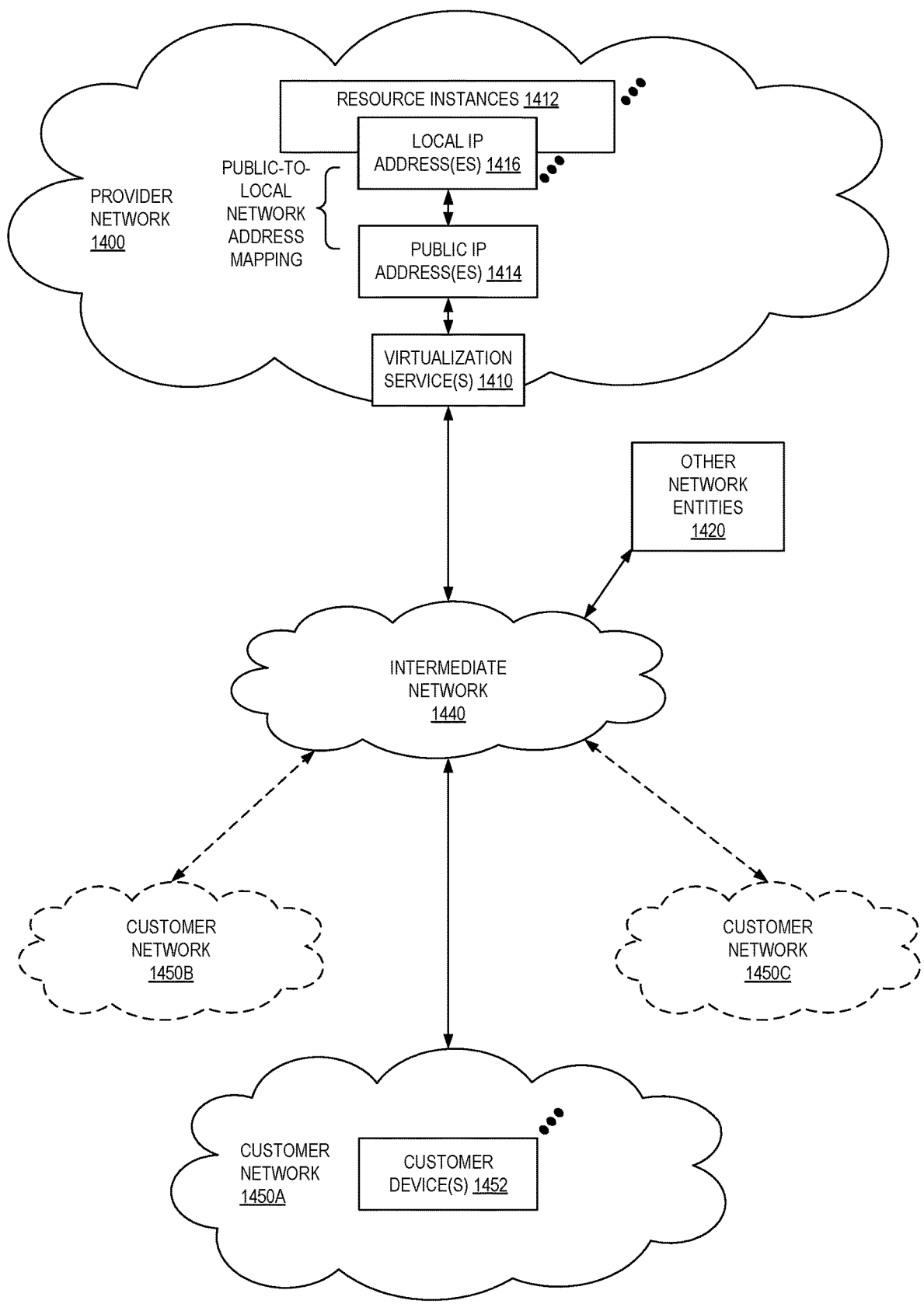
FIG. 14 illustrates an example provider network environment according to some examples.

FIG. 14 illustrates an example provider network (or "service provider system") environment according to some examples. A provider network 1400 can provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 can be associated with the resource instances 1412; the local IP addresses are the internal network addresses of the resource instances 1412 on the provider network 1400. In some examples, the provider network 1400 can also provide public IP addresses 1414 and/or public IP address ranges (e.g., Internet Protocol version 4 (IPv4) or Internet Protocol version 6 (IPv6) addresses) that customers can obtain from the provider 1400.

Conventionally, the provider network 1400, via the virtualization services 1410, can allow a customer of the service provider (e.g., a customer that operates one or more customer networks 1450A-1450C (or "client networks") including one or more customer device(s) 1452) to dynamically associate at least some public IP addresses 1414 assigned or allocated to the customer with particular resource instances 1412 assigned to the customer. The provider network 1400 can also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of the customer network(s) 1450A-1450C can, for example, implement customer-specific applications and present the customer's applications on an intermediate network 1440, such as the Internet. Other network entities 1420 on the intermediate network 1440 can then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 can be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1400; a customer can then assign their allocated public IP addresses to particular resource instances allocated to the customer. These public IP addresses can be referred to as customer public IP addresses, or simply customer IP addresses. Instead of being assigned by the provider network 1400 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
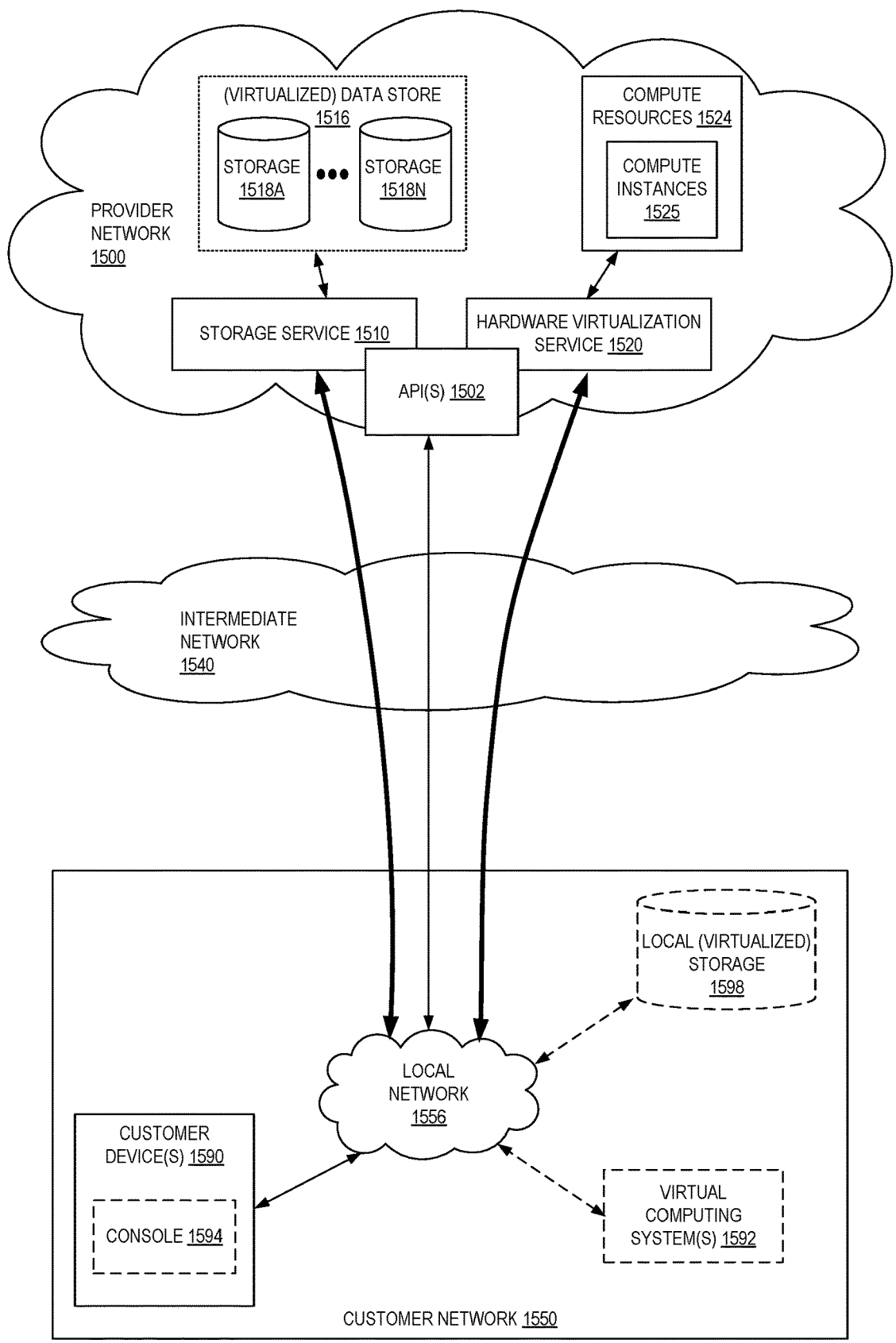
FIG. 15 is a block diagram of an example provider network that provides a storage service and a hardware virtualization service to customers according to some examples.

FIG. 15 is a block diagram of an example provider network environment that provides a storage service and a hardware virtualization service to customers, according to some examples. A hardware virtualization service 1520 provides multiple compute resources 1524 (e.g., compute instances 1525, such as VMs) to customers. The compute resources 1524 can, for example, be provided as a service to customers of a provider network 1500 (e.g., to a customer that implements a customer network 1550). Each computation resource 1524 can be provided with one or more local IP addresses. The provider network 1500 can be configured to route packets from the local IP addresses of the compute resources 1524 to public Internet destinations, and from public Internet sources to the local IP addresses of the compute resources 1524.

The provider network 1500 can provide the customer network 1550, for example coupled to an intermediate network 1540 via a local network 1556, the ability to implement virtual computing systems 1592 via the hardware virtualization service 1520 coupled to the intermediate network 1540 and to the provider network 1500. In some examples, the hardware virtualization service 1520 can provide one or more APIs 1502, for example a web services interface, via which the customer network 1550 can access functionality provided by the hardware virtualization service 1520, for example via a console 1594 (e.g., a web-based application, standalone application, mobile application, etc.) of a customer device 1590. In some examples, at the provider network 1500, each virtual computing system 1592 at the customer network 1550 can correspond to a computation resource 1524 that is leased, rented, or otherwise provided to the customer network 1550.

From an instance of the virtual computing system(s) 1592 and/or another customer device 1590 (e.g., via console 1594), the customer can access the functionality of a storage service 1510, for example via the one or more APIs 1502, to access data from and store data to storage resources 1518A-1518N of a virtual data store 1516 (e.g., a folder or "bucket," a virtualized volume, a database, etc.) provided by the provider network 1500. In some examples, a virtualized data store gateway (not shown) can be provided at the customer network 1550 that can locally cache at least some data, for example frequently accessed or critical data, and that can communicate with the storage service 1510 via one or more communications channels to upload new or modified data from a local cache so that the primary store of data (the virtualized data store 1516) is maintained. In some examples, a user, via the virtual computing system 1592 and/or another customer device 1590, can mount and access virtual data store 1516 volumes via the storage service 1510 acting as a storage virtualization service, and these volumes can appear to the user as local (virtualized) storage 1598.

While not shown in FIG. 15, the virtualization service(s) can also be accessed from resource instances within the provider network 1500 via the API(s) 1502. For example, a customer, appliance service provider, or other entity can access a virtualization service from within a respective virtual network on the provider network 1500 via the API(s) 1502 to request allocation of one or more resource instances within the virtual network or within another virtual network.

Illustrative Systems

Figure 16:
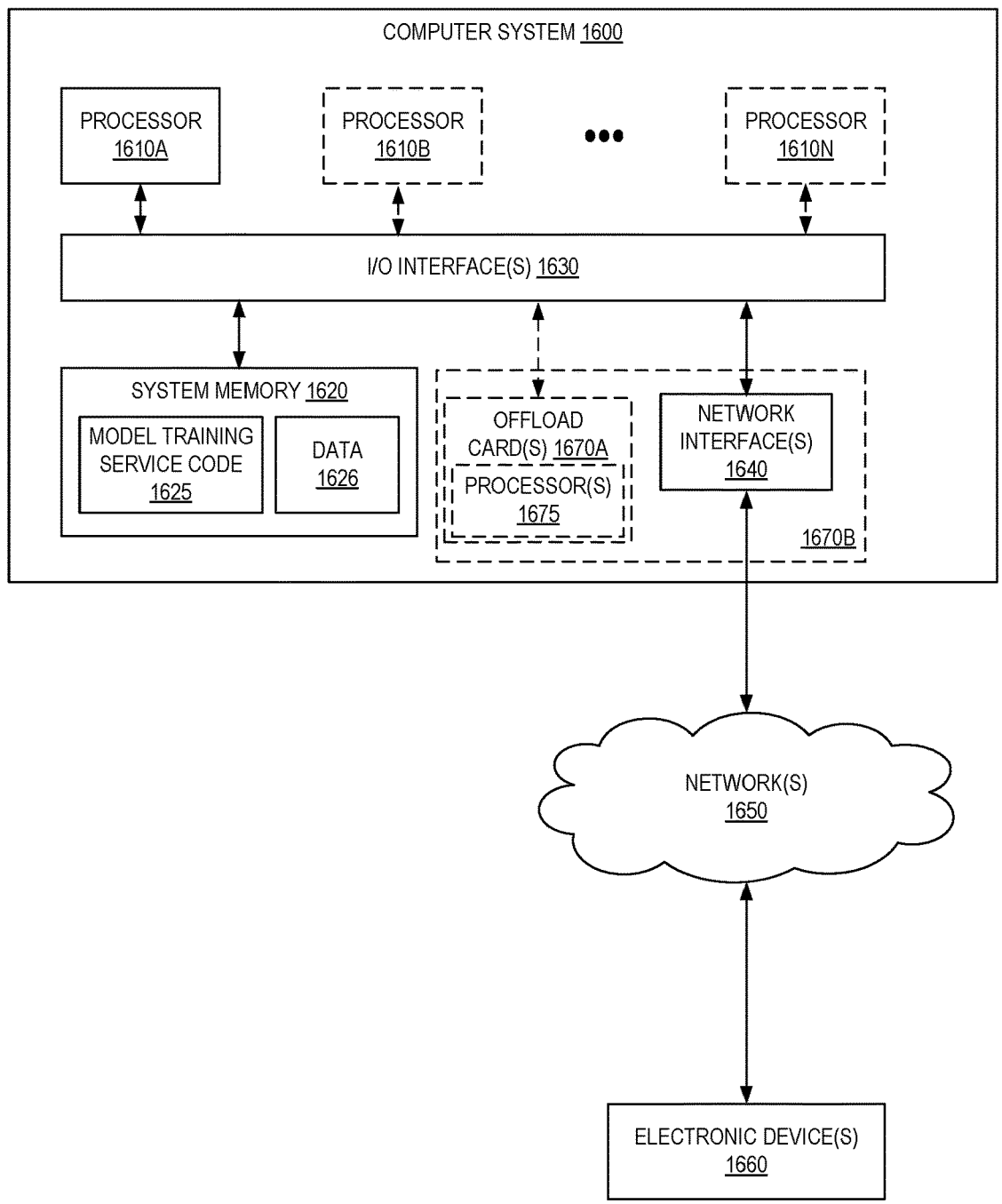
FIG. 16 is a block diagram illustrating an example computer system that can be used in some examples.

In some examples, a system that implements a portion or all of the techniques described herein can include a general-purpose computer system, such as the computer system 1600 (also referred to as a computing device or electronic device) illustrated in FIG. 16, that includes, or is configured to access, one or more computer-accessible media. In the illustrated example, the computer system 1600 includes one or more processors 1610 coupled to a system memory 1620 via an input/output (I/O) interface 1630. The computer system 1600 further includes a network interface 1640 coupled to the I/O interface 1630. While FIG. 16 shows the computer system 1600 as a single computing device, in various examples the computer system 1600 can include one computing device or any number of computing devices configured to work together as a single computer system 1600.

In various examples, the computer system 1600 can be a uniprocessor system including one processor 1610, or a multiprocessor system including several processors 1610 (e.g., two, four, eight, or another suitable number). The processor(s) 1610 can be any suitable processor(s) capable of executing instructions. For example, in various examples, the processor(s) 1610 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1610 can commonly, but not necessarily, implement the same ISA.

The system memory 1620 can store instructions and data accessible by the processor(s) 1610. In various examples, the system memory 1620 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1620 as model training system service code 1625 (e.g., executable to implement, in whole or in part, the model training system service 120) and data 1626.

In some examples, the I/O interface 1630 can be configured to coordinate I/O traffic between the processor 1610, the system memory 1620, and any peripheral devices in the device, including the network interface 1640 and/or other peripheral interfaces (not shown). In some examples, the I/O interface 1630 can perform any necessary protocol, timing, or other data transformations to convert data signals from one component (e.g., the system memory 1620) into a format suitable for use by another component (e.g., the processor 1610). In some examples, the I/O interface 1630 can include support for devices attached through various types of peripheral buses, such as a variant of the Peripheral Component Interconnect (PCI) bus standard or the Universal Serial Bus (USB) standard, for example. In some examples, the function of the I/O interface 1630 can be split into two or more separate components, such as a north bridge and a south bridge, for example. Also, in some examples, some or all of the functionality of the I/O interface 1630, such as an interface to the system memory 1620, can be incorporated directly into the processor 1610.

The network interface 1640 can be configured to allow data to be exchanged between the computer system 1600 and other devices 1660 attached to a network or networks 1650, such as other computer systems or devices as illustrated in FIG. 1, for example. In various examples, the network interface 1640 can support communication via any suitable wired or wireless general data networks, such as types of Ethernet network, for example. Additionally, the network interface 1640 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1600 includes one or more offload cards 1670A or 1670B (including one or more processors 1675, and possibly including the one or more network interfaces 1640) that are connected using the I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1600 can act as a host electronic device (e.g., operating as part of a hardware virtualization service) that hosts compute resources such as compute instances, and the one or more offload cards 1670A or 1670B execute a virtualization manager that can manage compute instances that execute on the host electronic device. As an example, in some examples the offload card(s) 1670A or 1670B can perform compute instance management operations, such as pausing and/or un-pausing compute instances, launching and/or terminating compute instances, performing memory transfer/copying operations, etc. These management operations can, in some examples, be performed by the offload card(s) 1670A or 1670B in coordination with a hypervisor (e.g., upon a request from a hypervisor) that is executed by the other processors 1610A-1610N of the computer system 1600. However, in some examples the virtualization manager implemented by the offload card(s) 1670A or 1670B can accommodate requests from other entities (e.g., from compute instances themselves), and can not coordinate with (or service) any separate hypervisor.

In some examples, the system memory 1620 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1600 via the I/O interface 1630. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1600 as the system memory 1620 or another type of memory. Further, a computer-accessible medium can include transmission media or signals such as electrical, electromagnetic, or digital signals, conveyed via a communication medium such as a network and/or a wireless link, such as can be implemented via the network interface 1640.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1518A-1518N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   in response to a call in a machine learning code to utilize a model training system of a provider network to execute a function, in a software developer kit (SDK) installed on a local machine:
   generating local runtime environment information for a virtualized, local environment and providing the virtualized, local runtime environment information to the model training system of the provider network, wherein the virtualized, local runtime environment, wherein the virtualized, local runtime environment
information is containerized,
serializing a function and arguments and providing the
serialized function and arguments to the model training system of the provider network,
generating a remote job request based at least in part on
local runtime environment information,
causing the model training system of the provider
network to execute the function remotely according
to the remote job request using a replication of the
virtualized, local environment; and
receiving a result of the execution of the function, wherein
the call includes at least one of:
an indication of one or more dependencies to install,
one or more pre-execution commands,
one or more pre-execution scripts,
one or more environment variables,
an indication of if the remote function should include
local directories,
a prefix to be used to create an underlying remote job
request,
an indication of a time limit to retain provisioned
infrastructure,
an indication of a session to use for service calls; a
listing of security requirements,
a listing of subnet identifiers,
a list of tags to attach to the job,
an indication of whether traffic between remote compute containers is to be encrypted during remote
compute, or
an indication of whether a container will be isolated.

2. The computer-implemented method of claim 1, wherein the runtime environment information includes runtime dependencies, packages, and environment variables of the local environment.

3. The computer-implemented method of claim 1, wherein the SDK is a Python SDK.

4. A computer-implemented method comprising:
in response to a call in source code to utilize a model training system of a provider network to execute a function:
generating local runtime environment information for a virtualized, local environment and providing the virtualized, local runtime environment information to the model training system of the provider network,
providing a function and arguments to the model training system of the provider network,
generating a remote job request based at least in part on local runtime environment information,
causing the model training system of the provider network to execute the function remotely according to the remote job request using a replication of the virtualized, local environment, and
receiving a result of the execution of the function, wherein the call includes at least three of:
an indication of if the remote function should include local directories,
a prefix to be used to create an underlying remote job request,
an indication of a time limit to retain provisioned infrastructure,
a listing of security requirements,
an indication of whether traffic between remote compute containers is to be encrypted during remote compute, or
an indication of whether a container will be isolated.

5. The computer-implemented method of claim 4, wherein the function and arguments are serialized.

6. The computer-implemented method of claim 4, wherein the runtime environment information includes runtime dependencies, packages, and environment variables of the virtualized, local environment.

7. The computer-implemented method of claim 6, wherein the call in the source code to utilize the model training system of a provider network to execute the function indicates to automatically determine runtime dependencies and a snapshot of a package management system environment is used to update runtime dependencies.

8. The computer-implemented method of claim 6, wherein the call in the source code to utilize the model training system of a provider network to execute the function indicates a usage of a package management system environment and the dependencies are updated according to a YAML (YAML Ain't Markup Language) file and the function is invoked in that package management system environment.

9. The computer-implemented method of claim 6, wherein the call in the source code to utilize the model training system of a provider network to execute the function indicates usage of custom dependencies and no package management system is indicated, a package management system environment is created and the function is invoked in that package management system environment.

10. The computer-implemented method of claim 6, wherein the call in the source code to utilize the model training system of a provider network to execute the function indicates a usage of a package management system environment and the dependencies are updated according to a requirements.txt file and the function is invoked in that package management system environment.

11. The computer-implemented method of claim 6, wherein the call in the source code to utilize the model training system of a provider network to execute the function indicates a usage of a package management system and no package management system is indicated, the runtime dependencies are installed at a system level without a virtual environment.

12. The computer-implemented method of claim 4, wherein the remote job request includes one or more of: a specification of a training algorithm including an image entry point and arguments; an indication of communications between containers are to be encrypted; an indication of if the execution is to be isolated; an indication of environment variables to set in the training container; one or more hyperparameters for the training algorithm; an input data configuration that describes input data and its location; an output data configuration specifies a location for the output; resource configuration information to indicate compute instances and/or storage to use for model training; an indication of retry strategy; an indication to use a warm pool of resources; and/or an indication of a stopping condition.

13. The computer-implemented method of claim 12, further comprising:
caching runtime dependencies to form a warm pool of resources, wherein a warm pool of resources is an initialized set of resources that are to not be released until a release condition has occurred.

14. The computer-implemented method of claim 4, further comprising:
accessing a container based at least in part on the remote job request; and
running the container in a runtime environment that mimics the local runtime environment, wherein running the container includes executing the function and reporting a result of the executing to a non-server based entity.

15. A system comprising:
a first one or more electronic devices to implement a model training system in a multi-tenant provider network; and
a second one or more electronic devices to implement a remote compute module, the remote compute module including instructions that upon execution cause the remote compute module to:
in response to a call in source code to utilize the model training system of the provider network to execute a function;
generate local runtime environment information for a virtualized, local environment and providing the virtualized, local runtime environment information to the model training system of the provider network,
provide a function and arguments to the model training system of the provider network,
generate a remote job request based at least in part on local runtime environment information,
cause the model training system of the provider network to execute the function remotely according to the remote job request using a replication of the virtualized, local environment, and
receive a result of the execution of the function, wherein the call includes at least three of:
an indication of if the remote function should include local directories,
a prefix to be used to create an underlying remote job request,
an indication of a time limit to retain provisioned infrastructure,
a listing of security requirements,
an indication of whether traffic between remote compute containers is to be encrypted during remote compute, or
an indication of whether a container will be isolated.

16. The system of claim 15, wherein the runtime environment information includes runtime dependencies, packages, and environment variables of the virtualized, local environment.

17. The system of claim 16, wherein the call in the source code to utilize the model training system of a provider network to execute the function indicates to automatically determine runtime dependencies and a snapshot of a package management system environment is used to update runtime dependencies.

18. The system of claim 16, wherein the call in the source code to utilize the model training system of a provider network to execute the function indicates a usage of a package management system environment and the dependencies are updated according to a YAML (YAML Ain't Markup Language) file and the function is invoked in that package management system environment.

19. The system of claim 16, wherein the call in the source code to utilize the model training system of a provider network to execute the function indicates usage of custom dependencies and no package management system is indicated, a package management system environment is created and the function is invoked in that package management system environment.

20. The system of claim 16, wherein the call in the source code to utilize the model training system of a provider network to execute the function indicates a usage of a package management system and no package management system is indicated, the runtime dependencies are installed at a system level without a virtual environment.

* * * * *